US012766534B2

(12) United States Patent
Joseph et al.

(10) Patent No.: US 12,766,534 B2
(45) Date of Patent: Oct. 20, 2026

(54) FLUID DELIVERY ASSEMBLY FOR A SPRAY GUN

(71) Applicant: 3M INNOVATIVE PROPERTIES COMPANY, St. Paul, MN (US)

(72) Inventors: Stephen C.P. Joseph, Woodbury, MN (US); Anna M. Hegdahl, Brooklyn Park, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1218 days.

(21) Appl. No.: 16/630,558

(22) PCT Filed: Jul. 13, 2018

(86) PCT No.: PCT/IB2018/055209

§ 371 (c)(1),
(2) Date: Jan. 13, 2020

(87) PCT Pub. No.: WO2019/012500

PCT Pub. Date: Jan. 17, 2019

(65) Prior Publication Data

US 2021/0086210 A1 Mar. 25, 2021

Related U.S. Application Data

(60) Provisional application No. 62/632,840, filed on Feb. 20, 2018, provisional application No. 62/532,596, filed on Jul. 14, 2017.

(51) Int. Cl.
*B05B 7/24* (2006.01)
*B65D 90/04* (2006.01)

(52) U.S. Cl.
CPC .......... *B05B 7/2478* (2013.01); *B65D 90/046* (2013.01); *B05B 7/2408* (2013.01); *B05B 7/2481* (2013.01)

(58) Field of Classification Search
CPC .. B65D 51/1683; B65D 25/005; B65D 31/14; B65D 35/46; B65D 47/241; B65D 47/06;
(Continued)

(56) References Cited

U.S. PATENT DOCUMENTS 3,157,360 A 11/1964 Heard
4,230,662 A 10/1980 Barnsbee
(Continued)

FOREIGN PATENT DOCUMENTS

DE 202006018491 4/2008
EP 0987060 3/2000
(Continued)

OTHER PUBLICATIONS

"Thermoforming", Suzhou Stone-Tech Co. Ltd., [retrieved from the internet on Sep. 6, 2012], URL <http://english.stone-tech.com.cn/news/html/?3.html>, pp. 1-3.
(Continued)

*Primary Examiner* — Robert Poon
(74) *Attorney, Agent, or Firm* — Martha J. Engel

(57) ABSTRACT

The present application is directed to a container (20) for holding paint. The container comprises at least two fluid ports (23, 40). The container has a body that is shape self supporting and is a non-rigid construction. At least one fluid port is a separate part (40) from the body of the container.

18 Claims, 17 Drawing Sheets

Figure 1:
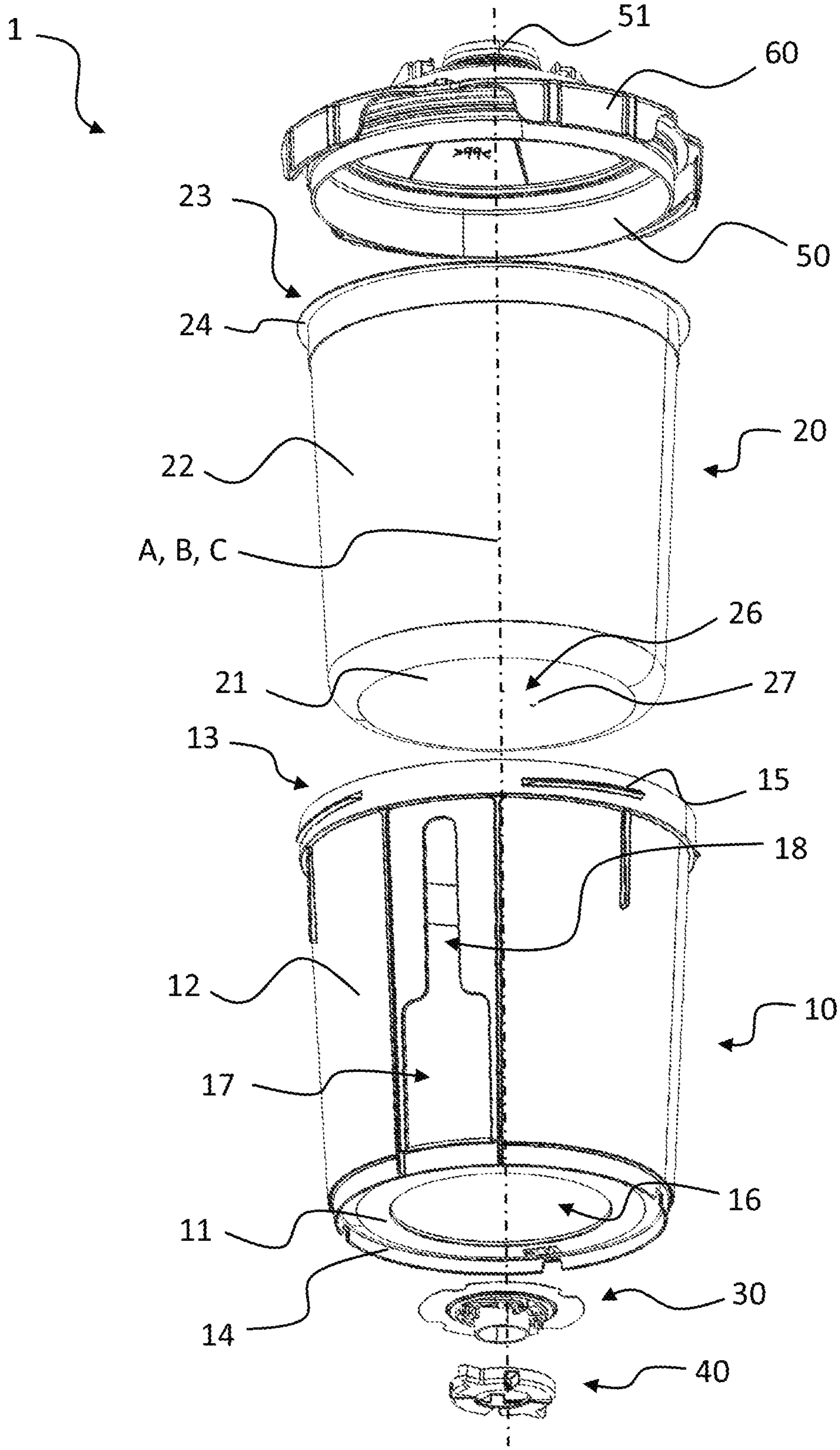

(58) Field of Classification Search
CPC .............. B65D 83/0061; B65D 83/207; B65D 83/0055; B65D 33/01; B65D 27/005; B65D 81/26; B65D 81/263
USPC ............ 220/203.07, 495.02, 495.01, 495.04; 383/36, 44, 45, 80, 103, 104; 239/340, 239/302, 327, 328, 591
See application file for complete search history.

(56) References Cited

U.S. PATENT DOCUMENTS

| | | | | |
|---|---|---|---|---|
| 4,496,408 | A | 1/1985 | Hahn | |
| 5,451,356 | A | 9/1995 | Hebert | |
| 6,007,884 | A | 12/1999 | Nittel | |
| 6,032,818 | A * | 3/2000 | Olson | B65D 90/046 220/495.01 |
| 6,419,872 | B1 | 7/2002 | Claisse | |
| 6,604,634 | B2 * | 8/2003 | Su | B65D 81/2038 206/524.8 |
| 6,820,824 | B1 | 11/2004 | Joseph | |
| 7,614,571 | B2 | 11/2009 | Camilleri | |
| 7,997,047 | B1 * | 8/2011 | Sargent | B65B 31/047 53/512 |
| 8,444,067 | B2 | 5/2013 | Schmon | |
| 2002/0179179 | A1 | 12/2002 | Volpenheim | |
| 2005/0258271 | A1 | 11/2005 | Kosmyna | |
| 2006/0110077 | A1 * | 5/2006 | Savage | B65D 77/067 383/906 |
| 2006/0113409 | A1 * | 6/2006 | Camilleri | B05B 7/2478 239/525 |
| 2007/0076988 | A1 | 4/2007 | Sullivan | |
| 2007/0095943 | A1 * | 5/2007 | Turnbull | B05B 7/2478 239/340 |
| 2007/0221754 | A1 | 9/2007 | Gehrung | |
| 2007/0235454 | A1 * | 10/2007 | Woodruff | A47K 3/001 220/495.01 |
| 2009/0072050 | A1 | 3/2009 | Ruda | |
| 2009/0095369 | A1 * | 4/2009 | Murray | B65D 75/5883 141/82 |
| 2010/0014789 | A1 | 1/2010 | Binger | |
| 2010/0288772 | A1 | 11/2010 | Wambeke | |
| 2010/0301049 | A1 | 12/2010 | Buchholz | |
| 2011/0214803 | A1 | 9/2011 | Homburg, Jr. | |
| 2012/0000992 | A1 | 1/2012 | Shih | |
| 2012/0205280 | A1 | 8/2012 | Ayats Ardite | |
| 2013/0058595 | A1 * | 3/2013 | Ekenhorst | B65D 5/748 383/80 |
| 2013/0221130 | A1 | 8/2013 | Joseph | |
| 2014/0008360 | A1 * | 1/2014 | Philip | D06F 95/002 220/9.4 |
| 2015/0090614 | A1 | 4/2015 | Joseph | |
| 2015/0151902 | A1 | 6/2015 | Woodward | |
| 2015/0203259 | A1 | 7/2015 | Mulvaney | |
| 2016/0059254 | A1 | 3/2016 | De Roo | |
| 2017/0013118 | A1 | 1/2017 | Lee | |
| 2017/0013120 | A1 | 1/2017 | Hodge | |
| 2017/0013121 | A1 | 1/2017 | Baeder | |
| 2017/0013127 | A1 | 1/2017 | Xue | |
| 2017/0013131 | A1 | 1/2017 | Craib | |
| 2017/0013135 | A1 | 1/2017 | Alexander | |
| 2017/0029569 | A1 | 2/2017 | Chaulagain | |
| 2017/0029573 | A1 | 2/2017 | Barrios | |
| 2017/0203887 | A1 | 7/2017 | Hegdahl | |
| 2019/0184408 | A1 * | 6/2019 | Tsai | F16K 15/202 |

FOREIGN PATENT DOCUMENTS

| | | |
|---|---|---|
| FR | 2982250 | 5/2013 |
| WO | WO 1994-19172 | 9/1994 |
| WO | WO 1997-003758 | 2/1997 |
| WO | WO 1998-032539 | 7/1998 |
| WO | WO 2001-012337 | 2/2001 |
| WO | WO 2002-085533 | 10/2002 |
| WO | WO 2003-028965 | 4/2003 |
| WO | WO 2003-045575 | 6/2003 |
| WO | WO 2004-037433 | 5/2004 |
| WO | WO 2005-068220 | 7/2005 |
| WO | WO 2006-098623 | 9/2006 |
| WO | WO 2007-003245 | 1/2007 |
| WO | WO 2008-143945 | 11/2008 |
| WO | WO 2013-134182 | 9/2013 |
| WO | WO 2016-069239 | 5/2016 |
| WO | WO 2016-069674 | 5/2016 |
| WO | WO 2017-007911 | 1/2017 |
| WO | WO 2017-069029 | 4/2017 |
| WO | WO 2017-074709 | 5/2017 |
| WO | WO 2017-074817 | 5/2017 |
| WO | WO 2017-123707 | 7/2017 |
| WO | WO 2017-123708 | 7/2017 |
| WO | WO 2017-123709 | 7/2017 |
| WO | WO 2017-123714 | 7/2017 |
| WO | WO 2017-123715 | 7/2017 |
| WO | WO 2017-123718 | 7/2017 |
| WO | WO 2017-189681 | 11/2017 |
| WO | WO 2017-189684 | 11/2017 |
| WO | WO 2018-109594 | 6/2018 |
| WO | WO 2019-012500 | 1/2019 |

OTHER PUBLICATIONS

International Search Report for PCT International Application No. PCT/IB2018/055209, mailed on Oct. 11, 2018, 7 pages.
International Search Report for PCT International Application No. PCT/IB2018/055211, mailed on Jan. 28, 2019, 9 pages.

* cited by examiner

FLUID DELIVERY ASSEMBLY FOR A SPRAY GUN

CROSS REFERENCE TO RELATED APPLICATIONS

This application is a national stage filing under 35 U.S.C. 371 of PCT/IB2018/055209, filed Jul. 13, 2018, which claims the benefit of U.S. Application No. 62/532,596, filed Jul. 14, 2017 and U.S. Application No. 62/632,840, filed Feb. 20, 2018, the disclosures of which are incorporated by reference in their entirety herein.

BACKGROUND

Various fluid delivery assemblies for spray guns are known in the art. In the collision repair industry, fluid delivery assemblies that allow the mixing of paint directly therein are widely used. One example is the PPS™ system by 3M (Maplewood, Minnesota, U.S.), which employs a re-usable outer cup and collar. A disposable liner is provided in the outer cup in order to mix paint therein. The disposable liner may be closed with a disposable filter lid. Such systems are disclosed, for example, in applicant's WO 98/32539 A1 (which is incorporated by reference herein in its entirety). Other types of liners for spray gun containers are known, for example, from U.S. Pat. No. 3,157,360.

Alternative systems rely on disposable cups in which the paint is mixed directly. One example is the RPS™ system sold by SATA (Kornwestheim, Germany). The cups are usually injection molded, do not collapse as the paint is dispensed from the gun, and may thus be provided with a vent. Such vented disposable cups for preparing, applying and preserving paint are known from, for example, U.S. Pat. No. 7,614,571 (which is incorporated by reference herein in its entirety). Further non collapsible containers are known from, for example, WO 2005/068220 A1, WO 2006/098623 A1, and applicant's WO 98/32539 A1 (all of which are incorporated by reference herein in their entirety).

SUMMARY

The present application is directed to a container for holding paint. The container comprises at least two fluid ports. The container has a body that is shape self supporting and is a non-rigid construction. At least one fluid port is a separate part from the body of the container.

It is an object of the present invention to improve known fluid delivery systems. In particular, it is an object of the present invention to provide a fluid delivery system including a container that may be manufactured in an economical manner, but can still provide for consistent flow rates (e.g., consistent flow rates from start to finish of the spray painting application/operation) and/or be used to spray with the gun upside down.

The above-mentioned objectives are achieved by the improved fluid delivery assemblies, spray guns, tools and methods according to the claims. Further aspects, improvements and variations are disclosed in the figures and the description.

In the context of the present disclosure, the term "paint" is used herein to include all forms of paint-like coating materials that can be applied to a surface using a spray gun, whether or not they are intended to color the surface. The term includes, for example, primers, base coats, lacquers and similar coating materials.

As far as reference is made to "thermo/vacuum forming" (or, for example, to containers produced by such "thermo/vacuum forming"), this means a process by which a sheet of polymeric (e.g., thermoplastic) material is heated to a softened condition (e.g., to its thermoplastic softening point) and formed into a desired shape, defined by a mold, while in that softened condition. It includes the case in which the application of a differential air pressure is used to assist in forming the material into the required shape. It may include the case in which a vacuum is produced on one side of the sheet to assist in forming it into the required shape (also known simply as "vacuum-forming") and/or pressure is produced on the opposite side of the sheet to assist in forming it into the required shape. It may include the case where a male plunger is employed on the relatively higher pressure side to assist in forming it into the desired shape. The use of vacuum is thus not necessarily required when "thermo/vacuum forming". In particular, it may be sufficient to apply positive pressure (in particular, positive air pressure) on one side of the sheet (e.g., on the side of the sheet facing away from a female cavity of a thermo/vacuum forming tool). On the opposite side of the sheet (e.g., on the side of the sheet facing towards the female cavity) a reduced pressure but also ambient pressure may be provided.

Furthermore, in the context of the present disclosure, the term "shape self supporting" defines an element or structure which does not collapse under the influence of gravity alone. In other words, a "shape self supporting" element or structure in the context of the present invention may be a structure that maintains (or at least generally maintains) its shape under the influence of gravity. Such a "shape self supporting" container (or liner), for example, may have a total height along its longitudinal axis. When the container is supported on and/or via its base, this total height may be reduced by less than 5%, preferably less than 2%, or even less than 1% under the influence of gravity alone. Alternatively or additionally, a "shape self supporting" container (or liner) in the context of the present disclosure may be a container which, when being held (e.g., between two fingers of a hand) at only one point along a top edge or a rim thereof, does collapse and/or does not substantially deform under the influence of gravity alone. Even further, alternatively or additionally, such container may be stood upside down on a top edge or rim thereof without deforming and/or collapsing under the influence of gravity alone. In some embodiments, a container that can be collapsed or flattened (e.g. for shipment) and is then formed back into a shape that is shape self supporting. For example, a pouch can be flattened, and the base of the pouch can be opened, or unfolded, to form a container which is then shape self supporting because, at least in part, the shape geometry, e.g. a curve around the base, may provide a structure to the sidewalls.

The term "rigid" is used to define containers and other structures that do not deform or collapse as fluid is withdrawn from the spray gun, even when the container is closed to the atmosphere. Moreover, containers and other structures defined as "rigid" may be too stiff to be compressed by manual pressure alone. A non-rigid container is outside the definition of rigid, and would therefore collapse as fluid is withdrawn The fluid delivery assembly may be configured to be connected to a spray gun directly or through one or more adapters.

The container according to the present invention preferably is thermo/vacuum formed from a polymeric material. The container may be made from, for example, polyethylene (e.g., low density polyethylene or high density polyethylene)

or polypropylene. The container may be formed from a blend of polymeric materials, for example a blend of polyethylene and polypropylene, or a blend of low density polyethylene and linear low density polyethylene. The container may optionally be thermo/vacuum formed from a thermoplastic material.

The container may alternatively or additionally comprise coatings and/or additives and/or material formulations which render an interior surface thereof repellent to paint. For example, the container may comprise material as described in PCT Pub. Nos. WO 2016/069674 A1 to Meuler et al.; WO 2016/069239 A1 to Meuler et al.; WO 2017/074817 A1 to Meuler et al.; WO 2017/074709 A1 to Elsbernd et al.; and/or in PCT Appln. Nos. US2017/029573 to Meuler et al. and/or US2017/029569 to Meuler et al., the disclosures of which are hereby incorporated by reference in their entirety.

Various technical approaches can be used to render the surface repellent to paint. The repellent surface may be characterized by a receding contact angle with a solution of 10% by weight 2-n-butoxyethanol and 90% by weight deionized water that is at least 35, 36, 37, 38, 39, 40, 41, 42, 43, 44, 45, 46, 47, 48, 49, 50, 55, 60, 65, or 70 degrees. The paint repellent surface may comprise a lubricant impregnated into pores of a porous layer as described in WO 2016/069674. The repellent surface may comprise a (e.g. non-fluorinated) organic polymeric binder and a siloxane (e.g. polydimethylsiloxane "PDMS") material as described in PCT Appln. No. US2017/029573. The repellent surface may comprise a (e.g. non-fluorinated) organic polymeric binder and a fluorochemical material as described in WO 2016/069674. The repellent surface may comprise a fluoropolymer as described in WO2016/069674.

The container may comprise a body having one or more container sidewalls and a container base. The container sidewalls and the container base may be integrally formed. For example, the container sidewalls and the container base are formed from a single sheet of polymeric material (in particular, via a thermo/vacuum forming process). The base may be any shape, symmetric or asymmetric. In some embodiments, the base is, for example, circular. The container sidewall(s), for example when using a thermo/vacuum forming process, may have a material thickness of 400 μm or less, preferably 300 μm or less, more preferably 250 μm or less. Similarly, the container base, for example when using a thermo/vacuum forming process, may have a material thickness of material thickness of 400 μm or less. Preferably, the container sidewall(s) and/or the container base have a material thickness of at least 25 μm, more preferably at least 100 μm. In some embodiments, the base may be substantially thicker than the sidewalls, for example the sidewalls may have a thickness of 40 μm and the base may have a thickness of 800 μm or more. The container may extend along a container longitudinal axis, which may be substantially perpendicular to the container base. The sidewalls may be tapered, in particular slightly tapered, towards the base. The sidewall(s) and/or the base of the container may be transparent or translucent, or in some examples, opaque. The sidewall thickness may be variable, and in some embodiments the sidewall thickness is less near the base.

The container comprises at least two fluid ports to allow fluid (air, liquids such as paint) to move through so as to enter and exit the container. In certain embodiments, the fluid ports are opposite each other. The fluid ports may be closed, or opened to facilitate fluid movement. In some embodiments, one fluid port is a separate part from the body of the container. In some examples, the separate part fluid port comprises a vent or venting structure.

One fluid port may be an open top end of the container. Generally, the fluid port that is the open end of the container is not a separate part fluid port. Even so, that fluid port may be closed using a sealing mechanism as hook and loop, adhesive, mechanical clips, zip-type closures, and others that is incorporated into the container, generally near the fluid port. The container top end may be delimited by the sidewall(s) and/or by a container rim. The material thickness of the container rim may be greater than the material thickness of the container base and/or greater than the material thickness of the one or more container sidewalls. For example, the material thickness of the container rim may be 400 μm or more, preferably 600 μm or more. The material thickness of the container rim preferably is less than 1.5 mm, more preferably less than 1 mm. The container rim may be omitted.

The above-mentioned separate part fluid port or vent may be provided in any portion of the container, for example, in a container sidewall and/or in the container base. Generally, the separate part fluid port is near the base of the container. More specifically, the separate part fluid port or vent may be provided by at least one hole (or other means of allowing the passage of air) extending through the respective sidewall and/or through the base. The separate part fluid port or vent may be provided by a plurality of vent holes extending through the respective sidewall or through the base, for example at least 3 vent holes or at least 4 vent holes. The total open surface of the separate part fluid port or vent hole or vent holes may be at least 4 $mm^2$, preferably at least 5 $mm^2$. The total open surface of the separate part fluid port or vent hole or vent holes preferably may be 15 $mm^2$ or less, more preferably 10 $mm^2$ or less. The vent hole(s) may be circular or any other shape.

In some embodiments, the separate part fluid port is in the base and is connected to a spray gun assembly. In such embodiments, the separate part fluid port would be configured to connect to the spray gun as described below.

The separate part fluid port or vent may be closable, particularly repeatedly closable. For example, the fluid delivery assembly according to the present invention, in particular the container, may comprise a closure or a valve assembly. The closure or valve assembly may be configured to be opened (such that air and/or paint is allowed to flow through the separate part fluid port or vent) and/or to be closed (such that flow of air and/or paint through the separate part fluid port or vent is inhibited). For example, the separate part fluid port or vent may be sealed in a liquid-tight and/or air-tight manner when the closure or valve assembly is closed. When the closure or valve assembly is opened, surrounding air may be allowed to flow through the separate part fluid port or vent into the container. Preferably, the valve assembly is manually operable, in particular operable without any tools. For certain applications, the valve may be of a nature that automatically closes, such as a valve (e.g., a check valve) that allows the passage of air into the container under a suitable pressure differential, but closes upon pressure equilibrium to seal against liquid exiting the container.

A suitable closure may be provided, for example, by at least one piece of film that may be peeled from and/or adhered and re-adhered to the container.

In some embodiments, the separate part fluid port or vent may be or comprise a passive member, such as a microfluidic channel (or channels), a breathable membrane, and/or a tortuous path that allows the passage of air but inhibits the through-passage of liquid. In such cases—particularly where collapsibility of the container is not desired or necessary—it may not be necessary to provide a closure for the separate part fluid port or vent. Such passive members may also be provided in combination with a closure.

The container may include at least one first element or component that is bonded to said container. In certain embodiments, the first element comprises the separate part fluid port as described herein. Therefore, the separate part fluid port may be manufactured and sealed to the container in the manner described for the first element herein. In embodiments with a separate part fluid port, the embodiment may additionally comprise an alternative first element. When a valve assembly is used, such first element or component may be a first element of the valve assembly. In particular, the first element may be bonded to the container such that it provides a seal (e.g., a hermetic seal) around the separate part fluid port or vent hole. If a plurality of vent holes is provided, the first element may provide a seal around several or all of these separate part fluid ports or vent holes. The first element may form a valve seat of the valve assembly.

More specifically, the first element may be bonded to a container sidewall or to the container base. In some embodiments, the first element has a bonding surface that contacts both the base and the sidewalls (or some portion thereof). In some embodiments, for example when the first element comprises a separate part fluid port, the bond is a fluid tight seal. In some embodiments, the first element is bonded to the container in the region of the separate part fluid port or vent hole(s). The first element may be bonded to the container in a non-movable and/or in a non-rotatable manner. This may be achieved via (during) a thermo/vacuum forming process, for example in the same thermo/vacuum forming step in which the container itself is formed. Alternatively or additionally, it is envisaged that the first element is glued (e.g., via an adhesive) and/or welded to the container (e.g., by ultrasonic welding), and/or mechanically retained by the thermoformed polymeric material (e.g., by way of the thermoformed material wrapping around and/or protruding into a portion of the first element to "grip" it and thereby retain it against the container). Such mechanical retention may also be referred to as a "form lock". The first element may thus also be referred to as being form locked to the container. The first element may be at least partially embedded into the container sidewall and/or into the container base, which may be achieved, in particular, via the above-mentioned thermo/vacuum forming process. As will be apparent to the skilled reader, any combination of these attachment techniques may be employed.

The first element may have a first side and a second side as well as a first element longitudinal axis extending from said first to said second side. The longitudinal axis of the first element may be substantially parallel to container longitudinal axis. The first side of the first element may be bonded to the container.

The first element may be formed from a polymeric material. Polymeric materials from which the first element may be formed include, for example, polypropylene and polyethylene (e.g., low density polyethylene or high density polyethylene). The first element, if polymeric, may be entirely or in part formed by other methods including, for example, thermo/vacuum forming, injection molding, blow-molding, and/or 3D printing. The first element may alternatively or additionally comprise metal or other non-polymeric materials. Some of these materials, in some instances, may not be susceptible to thermal bonding to the container in situ during thermoforming, but could then be bonded mechanically (e.g., by having the container material protrude into and/or wrap around the first element) and/or by an adhesive, or by induction welding, as described herein.

As will be evident to the skilled reader from the exemplary methods mentioned above, the first element may be formed via a different method than the container. In particular, the container may be thermo/vacuum formed while the first element may be, for example, injection molded.

The first element may be stiffer than the container sidewall and/or than the container base to which it is attached.

The first element may comprise at least one flange. The flange may extend from an attachment portion of the first element to which a second element of the valve assembly is attached. For example, the flange may surround the attachment portion and/or may be substantially circular. The flange may have a thickness of less than 2 mm, of less than 1.5 mm, of less than 1 mm, of less than 0.7 mm, of 0.5 mm or less, of 0.3 mm or less, of 0.2 mm or less, or even of 0.1 mm or less. On the first side of the first element, the flange may have an area of at least 1 $cm^2$, at least 2 $cm^2$, at least 3 $cm^2$, at least 5 $cm^2$, at least 7 $cm^2$, at least 10 $cm^2$, at least 12 $cm^2$, at least 15 $cm^2$, at least 20 $cm^2$, or at least 30 $cm^2$. As will be apparent to the skilled reader from the discussion provided below, such flange may enhance the bond between the first element and the container. To further enhance the bond, a thin flash may be provided, which may extend, for example, at least partially around the flange. Alternatively or additionally, the first element may comprise a rib and/or a channel (or a plurality of ribs and/or a plurality of channels) extending along the first side thereof, for example in the region of the flange. The rib may extend in an annular manner. Such rib(s) and/or channel(s) may be continuous or discontinuous. Other surface disruptions, such as altered surface finishes, micro-structures, and the like may be advantageously used as appropriate to promote bonding between the first element and the container.

The attachment portion may comprise an attachment member (e.g., a protrusion, a recess, or other feature that facilitates cooperative retention) onto which the second element of the valve assembly can be snap-fitted or otherwise attached. The attachment member may extend from the flange on the second side of the first element. The attachment member may be ring-shaped and can be provided with a bulge-like projection to snap-fit with the second element. The bulge-like projection may be directed radially outwardly.

The at least one first element may comprise at least one duct with a first end and a second end. The at least one duct may be provided by a through hole extending through the first element. Preferably, the first element may comprise a plurality of ducts. Each of these ducts may be provided by a through hole extending through the first element.

The first end of the duct may be open to the first side of the first element while the second end of the duct may be open to the second side of the first element. The at least one first element may overlap and/or cover the separate part fluid port or vent provided in the container. In particular, the first end of the duct may overlap the vent such that a continuous air path is formed between the duct and the separate part fluid port or vent and/or the respective vent hole(s). When a plurality of ducts is provided, each of the ducts may overlap a respective separate part fluid port or vent hole and/or form a continuous air path therewith. The second end of the duct may be open and/or may be exposed to surrounding atmosphere when the valve assembly is opened. When the valve assembly is closed, flow through the duct is preferably restricted. More preferably, the second end of the duct is sealed when the valve assembly is closed.

Such a seal can accomplish not only the prevention of liquid leaking from the container, but can further facilitate the collapse of the container during operation of a spray gun. In addition, the presence of a separate part fluid port or vent and associated seal may allow a painter to purge excess air from the container after the container is assembled to a spray gun and in the upright position (with the container above the gun). In particular, the painter may open the valve, collapse the container downwardly to purge any excess air, and then close the valve such that substantially only paint remains in the container.

The valve assembly may be formed within a single element or may comprise at least one second element configured to close the valve assembly. As such, the second element may also be referred to as a valve assembly closure. More specifically, the second element may be configured to seal the duct(s) extending through the first element. In particular, the second end of the duct(s) may be sealed by the second element when the valve assembly is closed. When a plurality of ducts is provided, a single second element may seal multiple or all of these ducts. The second element preferably is snap-fitted to the first element, more preferably snap-fitted onto the attachment protrusion. However, the second element may also be, for example, screwed onto the first element and/or pushed to the first element. The first and second elements can be integrally molded and/or can be connected to each other via, for example, a living hinge. The first element and the second element may be integrally molded (e.g., as a single-shot injection molded part). Such single-injection molded part can be configured for being broken in two separate parts by a user in order to provide the first and second elements.

The second element may be movable with respect to the first element. In particular, the second element may be configured to be moved from an open position in which the valve assembly is opened to a closed position in which the valve assembly is closed. For example, the second element could be rotatable with respect to the first element. In this case, the first element and the second element could be configured such that a rotation of less than 360°, preferably less than 180°, more preferably less than 90°, and even more preferably less than 80° is sufficient for moving the opened position to the closed position. The valve assembly may comprise at least one first stop feature for limiting rotation of the second element in the closed position and/or at least one second stop feature for limiting rotation of the second element in the open position. The first stop feature may be provided by first stop protrusion of the first element. The second stop feature may be provided by a second stop protrusion of the first element. The first and/or second stop protrusions may abut with a respective protrusion or recess provided to the second element.

The second element of the valve assembly may comprise one or more sealing surfaces. When the second element is in the closed position, these sealing surface(s) may seal, in particular, against a seal seat surface of the first element. The duct(s) in the first element may extend to said seal seat surface. More specifically, the second end of the duct(s) may be provided in and/or may be open to said seal seat surface. The seal seat surface may be provided at the second side of the first element. The second element may comprise at least one recess, wherein the valve assembly may be opened (i.e., the second element may be in the open position) when the second end of the duct is overlapped by said recess. Preferably, the second element features a plurality of recesses, each of which may overlap a respective separate part fluid port or vent hole when the second element is in the open position. In addition or alternatively to the above-mentioned recess or recesses, the second element may comprise at least one protrusion. The sealing surface may be formed on and is preferably provided by said protrusion. The second element may comprise a plurality of protrusions, in which case each of said protrusions may provide and/or have formed thereon a respective sealing surface. The valve assembly may be closed (i.e., the second element may be in the closed position) when the second end of the duct(s) is overlapped by said protrusion(s).

At least some of the sealing surface(s) may be provided with a sealing projection (e.g., a hemispherical sealing projection) that protrudes at least partially into the second end of the respective duct. This may improve the seal and/or provide an additional resistance against opening of the valve assembly. Alternatively or additionally, the surface of the protrusion forming the respective sealing surface itself may be at least partially rounded in the region overlapping the second end of the duct, so that the protrusion forming the respective sealing surface protrudes at least partially into the second end of the respective duct.

The second element may be configured to be moved from the open position to the closed position with a directional component along the first element longitudinal axis and/or along the container longitudinal axis. The second element may move toward the first side of the first element when shifting from the open position to the closed position. However, the second element may also move away from the first side of the first element when shifting from the open position to the closed position depending on the specific structural design of the valve assembly. Such axial movements may occur simultaneously with rotation of the second element, or may occur in the absence of rotation (e.g., in a valve incorporating only translational rather than rotational opening and/or closure movement).

For example, the first element may comprise at least one ramp, preferably a plurality of ramps. The second element may be configured to slide along said at least one ramp when moving from the open position to the closed position. Preferably, the at least one ramp may extend from a ramp start region to a ramp end region, wherein the seal seat surface may be provided in the ramp end region. Preferably, the ramp end region is spaced further apart from the first side of the first element than the ramp start region. However, depending on the design of the valve assembly, the ramp start region may also be spaced further from the first side of the first element than the ramp end region. The ramp or ramps may extend in an annular manner, for example in an annular manner around the attachment protrusion. For example, each of the ramps may extend along a segment of a circle. Alternatively or additionally, the second element may be provided with at least one ramp for moving the second element with respect to the first element along the container longitudinal axis.

The second element may be substantially ring-shaped. As such, the second element may also be referred to as a vent ring. With such design, the at least one recess may extend circumferentially along a segment of the vent ring. Alternatively or additionally, the at least one protrusion may extend circumferentially along a segment of the vent ring. When the vent ring comprises a plurality of recesses and/or a plurality of protrusions, each of these recesses and protrusions, respectively, may extend circumferentially along a segment of the vent ring. The protrusions may be located between and/or may interrupt the recess or recesses.

Valves embodying certain features described above are disclosed in U.S. Pat. Pub. No. 2015/0203259 A1 to Mulvaney et al., the disclosure of which is incorporated in its entirety herein. Features of other known valves may also be incorporated into a first and/or second element as described herein, for example, as described in U.S. Pat. Pub. Nos. 2006/0113409 A1 to Camilleri et al.; 2016/0059254 A1 to De Roo; 2010/0301049 A1 to Buchholz; 2007/0221754 A1 to Gehrung; 2010/0288772 A1 to Wambeke et al.; and German Utility Model No. DE 202006018491 U1 to Sata GmbH & Co. KG, the disclosures of which are each hereby incorporated by reference in their entirety.

Furthermore, the first element and/or the container may be provided with at least one first indication feature while the second element may be provided with at least one second indication feature. The first indication feature and/or the second indication feature may be visually recognizable by the user and may help the user to assess whether the separate part fluid port or vent assembly is opened or closed. With this respect, the positions of the first and second indication features may match when the valve assembly is in the closed position or when the valve assembly is in the open position. The first element and the second element may have different colors in order to provide a clear contrast and facilitate recognition of the relative positions by the user.

The first indication feature may be at least one mark. Such mark may be provided by at least one protrusion or at least one recess provided to the first element and/or to the container. Alternatively or additionally, a mark contrasting in color with the first element and/or with the container may be employed (e.g., a dot or a line). For example, the first indication feature may be provided by at least one indication recess in the flange (or a plurality of indication recesses in the flange, e.g., 3 or 4 recesses). Alternatively or additionally, the flange may be provided with at least one indication tab (or a plurality of indication tabs, e.g., 3 or 4 tabs) extending therefrom. When a plurality of indication recesses and or indication tabs are used, the recesses or tabs, respectively, may be spaced in regular manner around the circumference of the flange.

A corresponding second indication feature may be provided by at least one protrusion or at least one recess provided to the second element. For example, such second indication feature may be provided by at least one wing. Such wing may, for example, extend radially outwardly from the vent ring. Alternatively or additionally, a mark contrasting in color with the second element may be provided thereon (e.g., a dot or a line).

As will be apparent from the method for forming the containers of the present invention described below, the first element may comprise an anti-movement (e.g., anti-rotation or rotation restriction) feature configured to limit movement (e.g., rotation) of the first element in a thermo/vacuum forming tool. Such feature may allow, for example, rotating the second element with respect to the first element in the tool after creating the separate part fluid port or vent in the container. The rotation restriction feature may form one or more cavities for receiving a tool. For example, the movement restriction feature may be provided by a hexagonal cavity (e.g., for receiving an Allen-shaped protrusion of a thermo/vacuum forming tool), a star-shaped cavity (e.g., for receiving a torx-shaped tool), a slit or a cross, a chuck, or any other geometric profile or mechanism suitable to hold a part to restrain rotation. The movement restriction feature may be located within the attachment member. An anti-movement or movement restriction feature may also be referred to herein as an anti-rotation or rotation restriction feature in cases where rotation is implicated (linear, translation, or other movements are also contemplated as will be understood by the skilled person).

According to variations of the invention, the second element may be a plug that is attached to, particularly inserted into, the first element. In this case, both the first element and the second element may be bonded to and/or embedded into the a container sidewall or the container base in one of the manners described above (for example via the thermo/vacuum forming process described above, although also gluing and/or welding are envisaged). The second element may then be configured to be detached from the container by a user for opening the separate part fluid port or vent. Also in this case, the second element may be connected to the first element via a living hinge.

According to other variations of the invention, the first element may be a tubular member including a lumen therethrough. Such tubular member may be connected to a separate part fluid port or vent extending through the container base or through a container sidewall. In particular, such tubular member may extend from the container base to a container sidewall and then, optionally, through a cutout provided in an outer cup. Outer cups with respective cutouts that could be used in these and also in other variations of the invention are described in more detail below.

According to even further variations of the present invention, the first element includes or is formed by a breathable membrane that can itself (or in combination with another valve structure) permit the passage of air while inhibiting the passage of paint.

The fluid delivery assembly according to the present invention may further comprise an outer cup. The container according to the present invention may be configured to be inserted into the outer cup and/or to function as liner therein. As such, the outer cup may be configured to receive the container, for example when mixing paint in the fluid delivery assembly. Alternatively or additionally, the outer cup may be configured to receive the container when spraying paint from the fluid delivery assembly. The outer cup may be relatively rigid, in particular more rigid than the container. The outer cup may be configured to maintain its shape and/or to be non-collapsible as fluid is withdrawn from the fluid delivery assembly. It is to be noted, however, that the outer cup may also be dispensed with. For example, the fluid delivery assembly according to the present invention may be configured for spraying without such outer cup.

The outer cup may comprise one or more outer cup sidewalls. The outer cup may also comprise an outer cup base. The outer cup base, in particular, may also be omitted. The outer cup may have an outer cup top end, which may be open. The outer cup may be provided with an internal or external threading for engaging with a lid (see below). Such threading may be provided along a top portion of the outer cup sidewall(s), in particular proximate to the outer cup top end.

The outer cup may have an outer cup longitudinal axis, which may extend through the outer cup base and the outer cup top end. The outer cup longitudinal axis may be parallel or congruent with the container longitudinal axis when the container is received in the outer cup. A total outer cup height may be defined as the total length of the outer cup along the outer cup longitudinal axis.

The outer cup base may be provided with one or more spacing features (which may comprise protrusions) for spacing the base from an underlying support surface. In this case, the total outer cup height may be defined as the height measured along the outer cup longitudinal axis from the end of the spacing feature(s) to the outer cup top end.

The outer cup may be made from, for example, polyethylene or polypropylene. The outer cup base and/or the outer cup sidewall(s) may be transparent or translucent.

The sidewall(s) of the outer cup may be provided with one or more scales. The scale(s) on the outer cup may allow the user to assess volumes of liquids poured into the container. The scales may be configured to correctly reflect volumes of liquid poured into the container even in cases where the container differs in shape from the outer cup. The sidewall(s) of the outer cup may slightly taper towards the outer cup base.

The outer cup may provide a support structure that supports the container in the outer cup. The support structure may support the container in the outer cup such that the container base and/or the valve assembly does not contact (or just contacts, and/or is not proud of) an underlying support surface (e.g., a table) on which the outer cup is standing. For example, the container rim may be supported on the support structure of the outer cup. Such support structure for the rim may be formed, for example, by an edge and/or by a step of the outer cup. Such edge and/or step may be formed along the outer cup sidewall, in particular along a top portion and/or along an inner portion of the outer cup sidewall(s). Such edge may also be provided by a top rim of the outer cup, in particular by a top rim of the outer cup sidewall(s). Alternatively or additionally, the container may be supported on one or more spacing features (e.g., protrusions) of the outer cup sidewall(s) and/or on one or more indentations of the outer cup sidewall(s).

A cutout may be provided in the outer cup base and/or in at least one of the outer cup sidewall(s). The cutout may be configured such that the valve assembly protrudes therethrough and/or is seated therewithin. In other words, the valve assembly may protrude through and/or be located within a portion of the outer cup base and/or protrude through the outer cup sidewall(s) when the container is received in the outer cup. More than one cutout may be provided.

When the cutout is provided in the outer cup base, the cutout may encompass at least 20%, preferably at least 30%, more preferably at least 40%, and most preferably at least 50% of the surface of the outer cup base.

When the cutout is provided in an outer cup sidewall, the cutout may form at least one slot. The slot may extend along the respective sidewall in a direction that is generally parallel to the longitudinal axis (taking into account that the outer cup sidewall(s) may taper). However, also other shapes and extensions of the cutout or slot may be envisaged. The slot may comprise a first slot portion and a second slot portion. The first slot portion may be arranged closer to the outer cup base than the second slot portion. Both the first slot portion and the second slot portion may be wider (i.e., perpendicular to the longitudinal direction of the slot) than the part of the valve assembly protruding through the sidewall. This may allow the valve assembly to move along the slot as the container collapses within the outer cup. The first slot portion may be wider than the second slot portion in order to facilitate insertion of the valve assembly through the slot. For example, the first slot portion may be at least 1 cm, preferably at least 2 cm, more preferably at least 2.5 cm wide. The second slot portion may be at least 0.3 cm, preferably at least 0.5 cm, and more preferably at least 0.8 cm wide. The slot may extend over at least 50%, preferably at least 60%, more preferably at least 70%, and even more preferably at least 80% of the total outer cup height. The slot may also have a constant or substantially constant width.

The sidewall(s) may be provided with one or more ribs, which may be helpful, in particular, for reinforcing the sidewall(s) in the region of the cutout. For example, the sidewall(s) may be provided with at least two longitudinal ribs, one rip extending on each side of the cutout. The ribs may extend radially outward from the sidewall(s).

Outer cups embodying certain features described above are disclosed, for example, in PCT Appln. No. US2017/013120 to Hegdahl et al. entitled "Spray Gun Cups, Receptacles, and Methods of Use"; PCT Appln. No. US2017/013118 to Pitera et al. entitled "Modular Spray Gun Lid Assemblies and Methods of Design and Use"; and PCT Appln. No. US2017/013121 to Hegdahl et al. entitled "Spray Gun Cups, Receptacles, Lids, and Methods of Use"; and in U.S. patent application Ser. No. 15/375,556 to Hegdahl et al. entitled "Reservoir Systems for Hand-Held Spray Guns and Methods of Use", the disclosures of which are hereby incorporated by reference in their entirety.

The fluid delivery assembly according to the present invention may comprise at least one removable lid. The lid may have an outlet that is adapted for connection to an inlet of the spray gun or to an inlet of an adapter connected to the spray gun. The lid may at least partially cover the container top end. The lid may be funnel-shaped and may comprise a first, wider end adapted to couple to the container and/or to the outer cup as well as a second, narrower end that forms the fluid outlet.

The lid may be disposable and may be formed from a polymeric material (for example polyethylene or polypropylene). A translucent or transparent material may be chosen for the lid. The lid may be provided with a filter for filtering the paint as it is withdrawn from the fluid delivery assembly thorough the fluid outlet.

The lid may seal the container in a liquid-tight and/or air-tight manner. In particular, the lid may seal with a top portion of the container in such liquid-tight and/or air-tight manner. As will be apparent to the skilled reader, the lid may be connected to the container and/or to the outer cup in various manners. For example, the lid may be snap-fitted to the container and/or snap-fitted to the outer cup. Alternatively or additionally, the lid may be screwed onto and/or into the outer cup and/or the container. For this purpose, the lid may be provided with a first threading while the container and/or the outer cup could be provided with a second threading that engages with the first threading. Alternatively or additionally, the lid may be screwed onto the container and/or into the outer cup via a threading provided in an additional holding collar. The additional holding collar may, for example, be inserted into the outer cup before inserting the container, such that the container is supported in the outer cup via the holding collar. In this case, the second threading that engages with the first threading of the lid may be provided on an inner and/or on an outer surface of said holding collar. As a further alternative or in addition, the lid may comprise one or more foldable hooks that may be configured to engage with the outer cup. The connection between the lid and the container, as well as the connection between the lid and the outer cup, may be configured such that the container is removable from the spray gun and/or removable from the outer cup with the lid attached to the container. This may allow the user to dispose of the container with the lid attached, thus minimizing the risk of spilling paint.

The lid may comprise a central portion (in which the fluid outlet may be provided) and a peripheral portion (which may be the portion sealing with the container and/or the portion attaching the lid to the outer cup and/or to the container). The central and peripheral portions may be connected by a transverse portion.

The transverse portion may be provided with hook coupling means, which may be integrally formed with the lid. The hook coupling means may be arranged externally of the fluid outlet. For example, the hook coupling means may be spaced from said fluid outlet by a predetermined distance. The hook coupling means are preferably provided with inwardly extending lips, preferably lips extending towards the fluid outlet. The inwardly projecting lips may extend over a surface of a collar, which collar may be provided by the inlet of the spray gun or by an adapter attached to the inlet. The collar is preferably an external collar. Details of such connections and other connections that may be relied upon in the context of the present invention are disclosed, for example, in applicant's WO 01/12337 A1 and applicant's WO 2004/037433 A1, which are both incorporated herein by reference in their entirety.

The peripheral portion may include a cylindrical section that may be inserted into the container when the fluid delivery system is assembled. The cylindrical section may be provided with one or more annular protrusions for sealing with the container.

Alternatively or additionally, the peripheral portion may include a peripheral flange. The peripheral flange may be pressed onto the container when the fluid delivery system is assembled, in particular onto the container rim.

Lids embodying certain features described above are disclosed, for example, in PCT Appln. No. US2017/013120 to Hegdahl et al. entitled "Spray Gun Cups, Receptacles, and Methods of Use"; PCT Appln. No. US2017/013118 to Pitera et al. entitled "Modular Spray Gun Lid Assemblies and Methods of Design and Use"; PCT Appln. No. US2017/013121 to Hegdahl et al. entitled "Spray Gun Cups, Receptacles, Lids, and Methods of Use"; PCT Appln. No. US2017/013127 to Hegdahl et al. entitled "Wide-Mouthed Fluid Connector for Hand-Held Spray Guns"; PCT Appln. No US2017/013131 to Ebertowski et al. entitled "Button-Lock Fluid Connector for Hand-Held Spray Guns"; and PCT Appln. No. US2017/013135 to Ebertowski et al. entitled "Connector System for Hand-Held Spray Guns"; and in U.S. patent application Ser. No. 15/375,556 to Hegdahl et al. entitled "Reservoir Systems for Hand-Held Spray Guns and Methods of Use", the disclosures of which are hereby incorporated by reference in their entirety.

The fluid delivery assembly according to the invention may comprise a screw-on collar. Such screw-on collar may facilitate assembly of the fluid delivery assembly. However, it will be apparent to the skilled reader that such screw-on collar may also be dispensed with, depending on the design chosen for the connection between the lid and the container and/or outer cup.

The screw-on collar may be a separate element. It is preferred in the context of the present invention, however, to use a screw-on collar which is snap-fitted to the lid. More specifically, the screw-on collar may be snap-fitted between the peripheral flange of the lid and one or more holding protrusions extending from the lid's peripheral portion. Lids embodying a screw-on collar which is snap-fitted thereto are disclosed in, for example, PCT Appln. No. US2017/013120 to Hegdahl et al. entitled "Spray Gun Cups, Receptacles, and Methods of Use"; PCT Appln. No. US2017/013118 to Pitera et al. entitled "Modular Spray Gun Lid Assemblies and Methods of Design and Use"; and PCT Appln. No. US2017/013121 to Hegdahl et al. entitled "Spray Gun Cups, Receptacles, Lids, and Methods of Use"; and in U.S. patent application Ser. No. 15/375,556 to Hegdahl et al. entitled "Reservoir Systems for Hand-Held Spray Guns and Methods of Use", the disclosures of which are hereby incorporated by reference in their entirety.

The screw-on collar (whether snap-fitted or not) may be rotatable with respect to the lid. More specifically, the screw-on collar may be provided with an internal and/or with an external first threading that threadingly engages with a complementary second threading provided on the outer cup. The first and/or second threading does not have to be continuously formed, but may be provided by at least one and preferably a plurality of segments extending around the screw-on collar and the outer cup. Each segment preferably extends for an arc of less than 80°, less than 60°, less than 45°, or even less than 40° around a periphery of the screw-on collar and/or around a periphery of the outer cup, respectively. Such comparatively short rotation of the screw-on collar may further facilitate assembly.

The lid, in particular the lid's peripheral portion, may be provided with a first lid stop feature to limit rotation of the screw-on collar with respect to the lid in a first direction and/or with a second lid stop feature to limit rotation of the screw-on collar with respect to the lid in the opposite, second direction. The lid stop feature may be provided, for example, by a protrusion extending from the lid's peripheral portion, which can be the holding protrusion that is used to snap-fit the collar to the lid. Alternatively, one or both of the lid stop features could be provided as a recess. The screw-on collar may comprise a corresponding collar stop feature to limit rotation of the collar with respect to the lid. The collar stop feature may be provided by a protrusion and/or by a recess of the collar.

According to a further aspect, the present invention relates to a fluid delivery assembly for a spray gun with a container and a lid, wherein a vent is provided in the lid. As will be evident for the skilled person, the techniques described herein for forming such vent may equally be used when forming the lid, in particular when the lid is thermo/vacuum formed. In this context, the lid may be provided with any of the valve assemblies described herein.

In particular, a first element as described herein may be attached to the lid (e.g., when thermo/vacuum forming the lid). The container of such fluid delivery assembly may be shape self supporting and/or collapsible when fluid is withdrawn, but it may also be rigid. The lid may have any of the other features described for the lid herein. Also an outer cup may be provided in this context, which again may have any of the features described for the outer cup herein. Accordingly, the methods and tools for thermo/vacuum forming a container described herein may also be used in order to thermo/vacuum form a lid, in particular a lid with a vent.

According to a further aspect, the present invention relates to a spray gun, in particular to a gravity fed spray gun, comprising a fluid delivery assembly according to the present invention.

According to a further aspect, the present invention relates to a method of using the fluid delivery assemblies described herein. In particular, such use may include a step of providing a container according to the invention and pouring paint or paint components therein. It is preferable that the vent does not have to be closed by the user for this purpose. For example, the container may be delivered to the customer closed (e.g., by closing the vent with one of the above-mentioned closures or, if one of the valve assemblies described above is used, by delivering the container to the user with the valve assembly being closed). Different components of the paint may be mixed directly in the container. In this context, an outer cup according to the invention may be provided. The outer cup may be placed with the outer cup base on a support surface and the container may be inserted into the outer cup before paint is poured into said container. The outer cup, however, may also be replaced, for example, by a holding frame or other receptacle for the container.

Subsequently a lid according to the invention may be attached to the open top end of the container and an inlet of a spray gun (in particular, an inlet of a gravity fed spray gun) may be connected to the fluid outlet of the lid. It may be helpful in this context to invert the spray gun for connecting the gun's inlet to the fluid outlet. It is to be noted, however, that the fluid outlet of the lid could also be provided with a valve or membrane and such inversion may thus not be necessarily required (in particular, when connecting a new lid to the spray gun for the first time). When the gun is inverted for connection, it will usually be re-inverted subsequently for spraying. However, the gun could also be used upside-down with the assemblies according to the invention.

The fluid assembly may subsequently be used for spraying paint. In this context, the separate part fluid port or vent may be opened and closed by the user as desired. For example, the separate part fluid port or vent may be kept closed initially for purging air from the container and/or for spraying upside down. If the separate part fluid port or vent is closed, the container will collapse as the paint is drawn out. At a later moment, the vent may be opened in order to decompress or at least partially decompress the container and/or to achieve equilibrium with the surrounding (ambient) air pressure. This may be helpful, for example, when the user desires to empty the container completely. Moreover, this may address the perception of some users that the flow rate of paint becomes inconsistent towards the end of a paint job when prior art containers of this type become strongly folded and compressed. Alternatively, even if the container is configured to allow collapsing, the separate part fluid port or vent can be left in an open position such that the painter can spray using an open (vented) configuration. The container can be switched between these states during painting if desired by the painter. For example, if the painter wishes to initially spray in an open state, but then wishes to invert the spray gun to spray upside down, the separate part fluid port or vent can be closed to prevent leakage, and the container will begin to collapse in use to maintain proper paint flow to the gun.

After the respective paint job is finished, the user may close the separate part fluid port or vent. The user may then invert the spray gun and subsequently disconnect the fluid delivery assembly therefrom. Before the fluid delivery assembly is entirely disconnected, the trigger of the spray gun may be actuated one or more times in order to drain paint back from the gun to the container. A port for pressurized medium (e.g., pressurized air) may be closed before actuating the trigger and/or the respective pressurized medium supply may be disconnected. The container may be stored with the separate part fluid port or vent being closed and the left-over paint remaining therein. Alternatively, the container (and, optionally, any remaining paint) can be disposed off, for example with the disposable lid in place to avoid paint from spilling. In some examples, any leftover paint can be drained from the container prior to its disposal.

According to a further aspect, the present invention may relate to a method of forming a container, in particular to a method of forming a container for a fluid delivery assembly according to the invention. The method may, in particular, comprise the steps of (a) providing a sheet of polymeric material, (b) inserting the sheet into a thermo/vacuum forming tool, (c) thermo/vacuum forming the sheet into a container, and (d) removing the container from the thermo/vacuum forming tool.

The container may comprise a separate part fluid port or vent. With the method according to the present invention, the separate part fluid port or vent is preferably created before the container is removed from the thermo/vacuum forming tool, as will be described further below.

The container may further comprise at least one first component or element attached thereto. For example, a closure and/or a valve assembly may be attached to the container before and/or prior to removing the container from the thermo/vacuum forming tool. Therefore, optionally, no subsequent manufacturing steps may be required for creating the separate part fluid port or vent, attaching a closure or valve assembly and/or for closing the separate part fluid port or vent.

As will be apparent to the skilled reader, these steps may be performed in the order (a) to (d) indicated above. Depending on the size, the sheet may also be referred to as a billet.

The thermo/vacuum forming tool may comprise at least one female mold member. The female mold member may provide a first cavity for shaping the container. The first cavity may generally correspond in shape to the outer shape of the container and the thermo/vacuum forming tool (and/or the related process) may be configured to press the sheet against the first cavity, in particular against an inside wall and/or inside surface of said first cavity.

More specifically, the sheet may have a first sheet surface and a second sheet surface, wherein the second sheet surface may face towards the female mold member when the sheet is inserted into the thermo/vacuum forming tool. At least part of the second surface may be pressed against the first cavity when thermo/vacuum forming. The second sheet surface may subsequently form an outer surface of the container. The first sheet surface may form an inner surface of the container. To thermo/vacuum form the sheet into the container, positive pressure may be applied to the first surface and/or negative pressure may be applied to the second surface. Thermo/vacuum forming the sheet into the container may lead to a container having a container base and one or more container sidewalls that are integrally formed. In particular, the container base and the container sidewall(s) may be formed from the (single) sheet (or billet) of polymeric material.

As described above, the separate part fluid port or vent of the container according to the invention may be configured to be closed and/or to be opened. The separate part fluid port or vent may be located in the container base and may be provided as at least one vent hole extending through said container base. In particular, the separate part fluid port or vent may be provided as a plurality of vent holes extending through the container base, as described above. Alternatively or additionally, the separate part fluid port or vent may be located in a container sidewall (or, as described herein, in any portion of the container or other component such as a lid). In other words, there may be cases in which the separate part fluid port or vent is not located in the container base. The separate part fluid port or vent may, for example, be provided as at least one vent hole extending through said container sidewall. In particular, the separate part fluid port or vent may be provided by a plurality of vent holes extending through said container sidewall.

The method according to the invention may further include a step of bonding at least one first element, which may also be referred to as a first component in the context of the present disclosure, to the container. This first element, optionally, may be a first element of a valve assembly (in particular, the first element described above). The first element, however, may also serve other purposes and function, for example, as a stiffening component and/or support.

The first element may be bonded to the container during the thermo/vacuum forming process itself, in particular while thermo/vacuum forming the sheet into a container and/or immediately thereafter. The first element may be bonded to the container before the thermo/vacuum forming tool is opened and/or before the container is removed from the thermo/vacuum forming tool. For this purpose, the first element may be placed at least partially in the first cavity before inserting the sheet into the thermo/vacuum forming tool and/or before thermo/vacuum forming the sheet into the container. In this context, the first side of the first element may face towards the first cavity. The first element (in particular its first surface) may form at least a portion of the sidewall of the first cavity in this case.

The thermo/vacuum forming tool may provide at least one second cavity which at least partially receives the first element. This second cavity may be provided, in particular, in the female mold member. The second side of the first element may face towards the second cavity when the first element is placed in the thermo/vacuum forming tool.

As described above, the at least one first element may be bonded to a container sidewall and/or to the container sidewall (or, in other words, to a portion of the sheet forming a container sidewall and/or to a portion of the sheet forming the container base). The first element may be at least partially embedded into said container sidewall and/or into said container base. Without wanting to be bound by theory, it is believed that the attachment (and thus the seal) between the first element and the container may be more stable when the first element is embedded at least partially into the sheet material. This may be advantageous, for example, when the first element forms a valve seat (as described above) and/or when the first element supports one or more further elements that are to be manipulated by the user.

The first element may be heated before and/or while being contacted to the sheet when forming the bond. For example, the at least one first element may be pre-heated before being placed in the thermo/vacuum forming tool (i.e., in particular before being placed in the female mold member and/or before being received in the first and/or second cavity). Alternatively or additionally, the first element may be heated in the thermo/vacuum forming tool (i.e., when being placed in the female mold member and/or when being received in the first and/or second cavity). For example, the first element may be heated in the tool from the second side before and/or during bonding. As also described below, the tool may be provided with a heating element for this purpose, for example with a glass rope heating element. In either case, the first element may be heated, for example, to its softening temperature or even close to its melt temperature. For example, the first element may be heated to a temperature of at least 70° C., preferably at least 80° C., more preferably at least 90° C., and most preferably at least 100° C. Without wanting to be bound by theory, it is believed that the strength of the bond between the sheet and the first element may be increased when the first element is heated.

As described above, the first element, which may be placed into the tool before thermo/vacuum forming, may be an injection molded part.

In the method according to the present invention, a hole or vent in the container may be provided by forming in situ (e.g., by bursting) at least one vent hole through the sheet, in particular by forming at least one vent hole through the sheet during the thermo/vacuum forming process. The hole may be formed through the sheet after inserting the sheet into the thermo/vacuum forming tool and preferably after forming the sheet into the container. Additionally or alternatively, the hole may be formed through the sheet before the thermo/vacuum forming tool is opened and/or before the container is removed from the thermo/vacuum forming tool. In other words, the method of the present invention may include at least one step of forming (e.g., by bursting) a hole (e.g. for receiving a separate part fluid port) or vent into the container, which may be performed, for example, after forming the sheet into the container but before opening the thermo/vacuum forming tool and/or before removing the container from the thermo/vacuum forming tool.

Forming of a hole may be achieved by providing sufficient differential pressure to force an opening to be created in the container material. Sufficiency of the differential pressure may be determined by the manufacturer depending on, for example, container material thickness and type, desired open duct area, in situ container material temperature, and cavity temperature. In general, thicker container material, more viscous (or less pliable) container material, smaller open duct area, and lower in situ container material temperature, and lower cavity temperature would tend to require higher differential pressures to result in formation of a vent hole, and vice versa.

Forming a hole by bursting may be achieved by providing (or facilitating or allowing) at least one burst of compressed fluid, e.g., air, that forms one or more holes through the sheet at one or more pre-determined locations. For example, the surface in the female mold member against which the second surface of the sheet is pressed when thermo/vacuum forming may be interrupted at one or more pre-determined locations. During the thermo/vacuum forming process, an increased relative pressure may be exerted on the sheet at these pre-determined locations. For example, the pressure acting on the second surface of the sheet at these pre-determined locations may be reduced and/or the pressure acting on the first surface of the sheet at these pre-determined locations may be increased. Such reduction or increase may generally be present generally during the thermo/vacuum forming, but preferably is applied at one or more pre-determined points in time.

When a hole is formed by bursting as described herein, material of the container at the area of bursting may tend to be forced into (or even through) the respective hole in the first element, thereby reducing the final opening of the separate part fluid port or vent hole in proportion to the thickness of the container material that is so forced. By way of example, if a hole in the first element is circular (which is optional) and has a diameter of 2.0 mm, and a container material is burst therethrough with a uniform final material thickness of 0.5 mm in the portion that has been forced into the hole, the final diameter of the resulting vent hole will be 1.0 mm. Due to this effect, it will be understood by the skilled person in such situations that the initial size of the hole in the first element should be chosen such that the resulting separate part fluid port or vent hole will be the desired size upon completion of the process.

In this context, the thermo/vacuum forming tool may comprise at least one separate part fluid port or vent channel. The separate part fluid port or vent channel may be provided in the female mold member. The channel may connect the at least one first cavity and/or the at least one second cavity to atmospheric pressure and/or to a reduced pressure source (e.g., a vacuum source). The separate part fluid port or vent channel may have a cross section of at least 0.4 $mm^2$, preferably at least 0.5 $mm^2$, and more preferably at least 1 $mm^2$. Alternatively or additionally, the separate part fluid port or vent channel may have a cross section of less than 20 $mm^2$ and preferably less than 15 $mm^2$. The vent channel may have a substantially circular cross section.

The thermo/vacuum forming may further comprise at least one valve configured to close and/or to open the separate part fluid port or vent channel. Accordingly, the method of the present invention may include at least one step of opening the separate part fluid port or vent channel and/or at least one step of closing the separate part fluid port or vent channel. For example, the separate part fluid port or vent channel may be opened (e.g., via the valve) to decrease the pressure acting on the second surface of the sheet at the pre-determined locations, thereby sufficiently increasing the differential pressure across the container material to form (e.g., by bursting) the separate part fluid port or vent through the container. In particular, the separate part fluid port or vent channel may be opened while and/or after the first element of the valve assembly is bonded to the container. Subsequently, the separate part fluid port or vent channel may be closed (e.g., via the valve), for example before starting a new thermo/vacuum forming cycle. The separate part fluid port or vent channel may be kept closed (e.g., via the valve) during at least part of the time required for the step of thermo/vacuum forming the sheet into the container. In particular the separate part fluid port or vent channel may be kept closed (e.g., via the valve) during at least an initial part of the thermo/vacuum forming step, for example until the second surface of the sheet contacts the first cavity and or the first element of the valve assembly.

Preferably, the holes are formed (e.g., by bursting) through the sheet after the first element of the valve assembly has been bonded thereto. Thereby, the holes may automatically be created at the location of the duct or ducts, respectively, provided in the first element, in particular if the second end of said duct or ducts is kept open and connected to the channel.

Alternatively or additionally to the forming (e.g., by bursting) process described above, the sheet provided in step (a) may have at least one penetration (which may be a hole, a slit, or alternative geometry as appropriate to achieve the desired results) formed therein. In other words, the sheet provided in step (a) may feature at least one penetration formed therein before the step of thermo/vacuum forming the sheet into the container. The penetration may be, for example, drilled, laser cut, or punched into the sheet.

The at least one penetration may be configured to create a fluid port or vent. The sheet may be provided with exactly one penetration, but may also comprise a plurality of such penetrations. Such penetration may (if circular) have, for example, a diameter of less than 2 mm, preferably less than 1 mm, and more preferably less than 0.5 mm. Alternatively or additionally, such penetration may have, for example, a diameter of at least 0.25 mm, preferably at least 0.3 mm.

The penetration formed in the sheet preferably is enlarged during the thermo/vacuum forming process by stretching the sheet. Optionally, the penetration may be enlarged further during and/or after the thermo/vacuum forming process, for example by providing at least one burst of compressed air therethrough.

When the separate part fluid port or vent of the container is to be closed by a piece of film (e.g., a piece of film that can be peeled by the user to open the separate part fluid port or vent), such piece of film may be placed at least partially in the first cavity before inserting the sheet into the thermo/vacuum forming tool and/or before thermo/vacuum forming the sheet into the container. Similarly to the discussion provided with respect to the first element above, this may allow bonding the film to the container while the container is still in the thermo/vacuum forming tool. The material thickness of the film may be inferior to the material thickness of the container sidewall and/or of the container base to which the film is bonded. The film may create a hermetic seal around the separate part fluid port or vent. A tab may be provided to the film, which preferably is not bonded to the container to assist the user in peeling the film. Alternatively or additionally, the film may be adhesive backed, preferably on the side which is to adhere to the container.

In addition to the first element, also at least one second element of the valve assembly (in particular, the second element described above) may be inserted into the thermo/vacuum forming tool before the step of inserting the sheet therein and/or before the step of thermo/vacuum forming the sheet into the container. The second element may be attached to the first element before the first element is placed in the thermo/vacuum forming tool and/or it may be attached to the first element before the container is removed from the thermo vacuum forming tool.

According to the method of the present invention, the separate part fluid port or vent may be closed before the thermo/vacuum forming tool is opened and/or before the step of removing the container from the thermo/vacuum forming tool. In particular, the separate part fluid port or vent assembly according to the present invention may be closed. For example, the method may include a step of moving the second element of the valve assembly into the closed position before the thermo/vacuum forming tool is opened and/or before the container is removed from the thermo/vacuum forming tool. In particular, the second element may be rotated with respect to the first element into the closed position before the thermo/vacuum forming tool is opened and/or before the step of removing the container from the thermo/vacuum forming tool. In other words, the method may include a step of rotating the vent ring closed in the thermoforming cavity.

According to a further aspect, the present invention relates to a thermo/vacuum forming tool, in particular to a thermo vacuum forming tool for manufacturing a container according to the present invention. More specifically, the present invention may relate to a thermo/vacuum forming tool for forming a sheet of polymeric material into a container according to the present invention. The tool may be configured to apply positive pressure to a first surface of the sheet and/or negative pressure to a second side of the sheet.

As described above, the tool may comprise a channel that may be closed and/or opened. The tool may comprise a valve (e.g., a solenoid valve) to open and/or to close the channel.

The channel preferably is provided in a female mold member of the tool. The channel preferably connects one or more pre-determined areas of a sidewall of a first cavity and/or a second cavity to surrounding atmosphere or to a source of reduced pressure (e.g., a vacuum source). The first and/or the second cavity preferably is provided in the female mold member.

As further described above, the tool may also include a heating element, preferably a glass rope heating element. The heating element is preferably provided in the female mold member and may be configured to heat a separate part (in particular, a first element of a valve assembly according to the invention) that is inserted into the female mold member before the sheet is thermo/vacuum formed into the container.

The thermo/vacuum forming tool may comprise at least one mechanism for rotating the second element into its closed position before the thermo/vacuum forming tool is opened and/or before the container is removed from the thermo/vacuum forming tool.

Furthermore, the thermo/vacuum forming tool may comprise at least one rotation restriction mechanism for preventing rotation of the first element in the tool and/or with respect to the container. In particular, the thermo/vacuum forming tool may comprise a rotation restriction mechanism for preventing rotation of the first element in the tool while the second element of the valve assembly is rotated. Such rotation restriction mechanism may be provided by at least one pin configured to engage with a respective rotation restriction feature of the first element, as described above. Such pin may be provided, for example, by an Allen-, torxs-, slit- or cross-shaped protrusion, which may be provided, for example, in the female mold member (in particular in the second cavity of the female mold member).

As will be apparent to the skilled reader from the description provided above, the method according to the present invention allows to create the separate part fluid port or vent in the container without cutting and/or stripping material from the sheet while the sheet is in the mold and/or thereafter. In particular, no further cutting step and/or step of removing material from the container is required for creating the separate part fluid port or vent after removing the container from the thermo/vacuum forming tool.

While the method described above may avoid the need for further manufacturing steps in order to create the separate part fluid port or vent and/or to attach a closure or valve assembly to the container and/or to close the separate part fluid port or vent, it will be apparent to the skilled person that the vent may also be provided after opening the tool and/or after removing the container from the tool (e.g., via a separate drilling, punching and/or laser cutting step). Also the closures or vent assemblies may be attached after opening the tool and/or after removing the container from the tool (e.g., via a separate gluing or ultrasonic welding step). Moreover, the separate part fluid port or vent may be closed (e.g., by the manufacturer or even by the customer) after opening the tool and/or after removing the container from the tool (e.g., manually). Although this may increase manufacturing costs, it should be noted that such variations are equally covered by the present disclosure.

BRIEF DESCRIPTION

Figure 2:
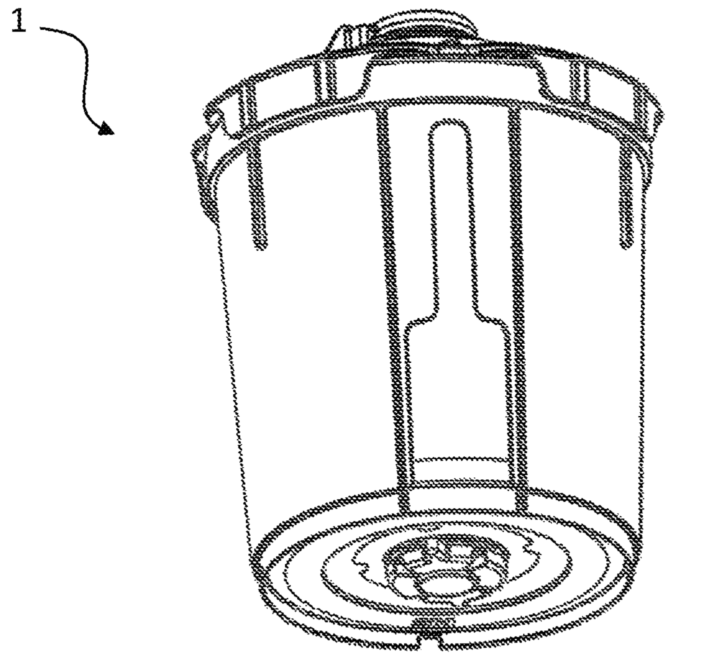
Figure 3:
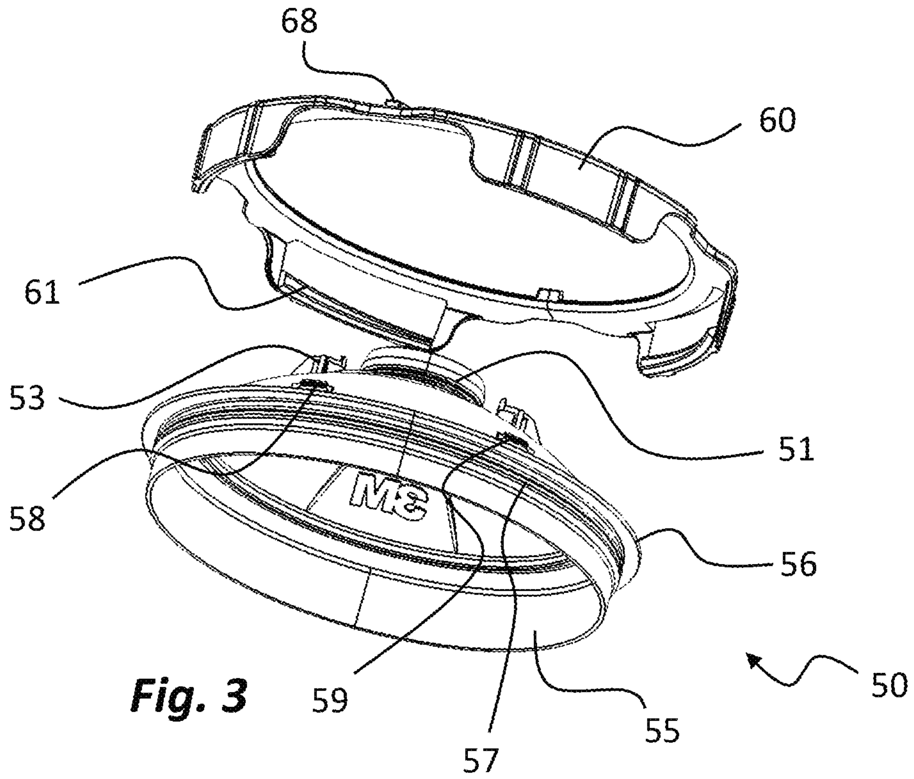
Figure 4:
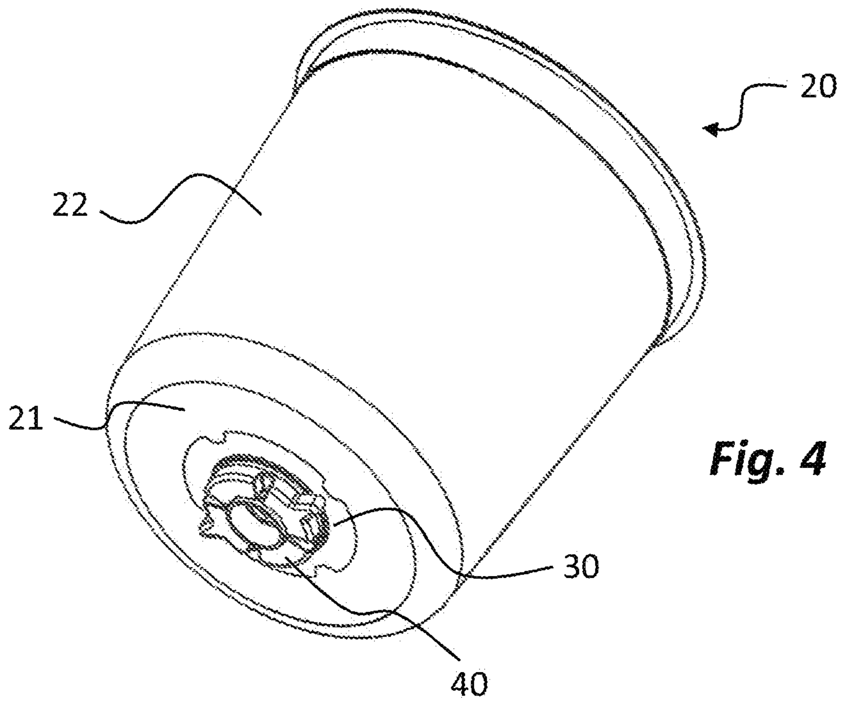
Figure 5:
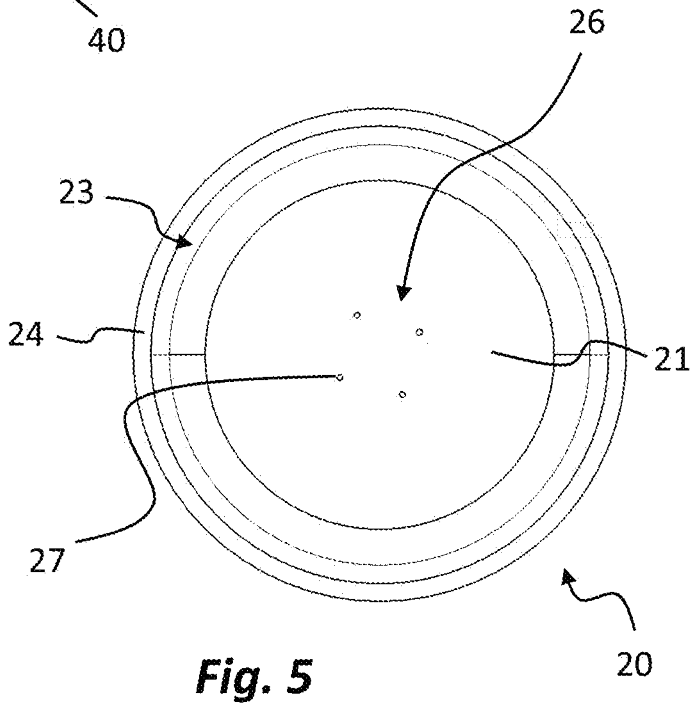
Figure 6:
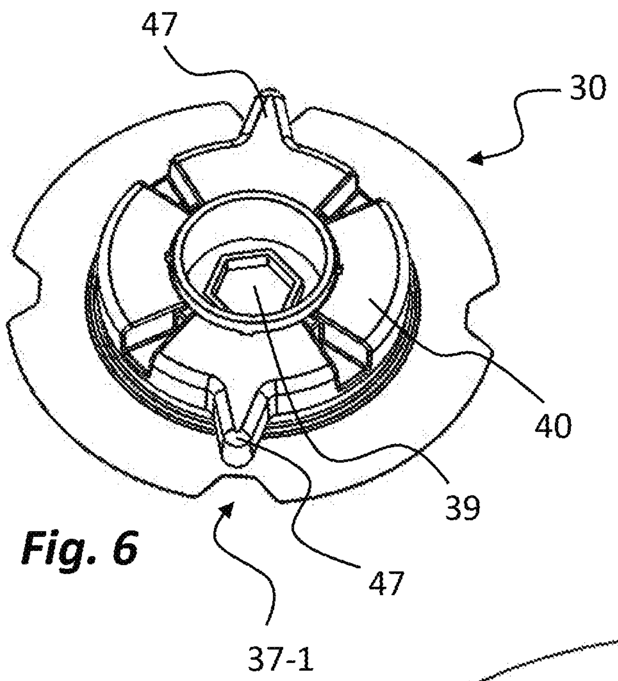
Figure 7:
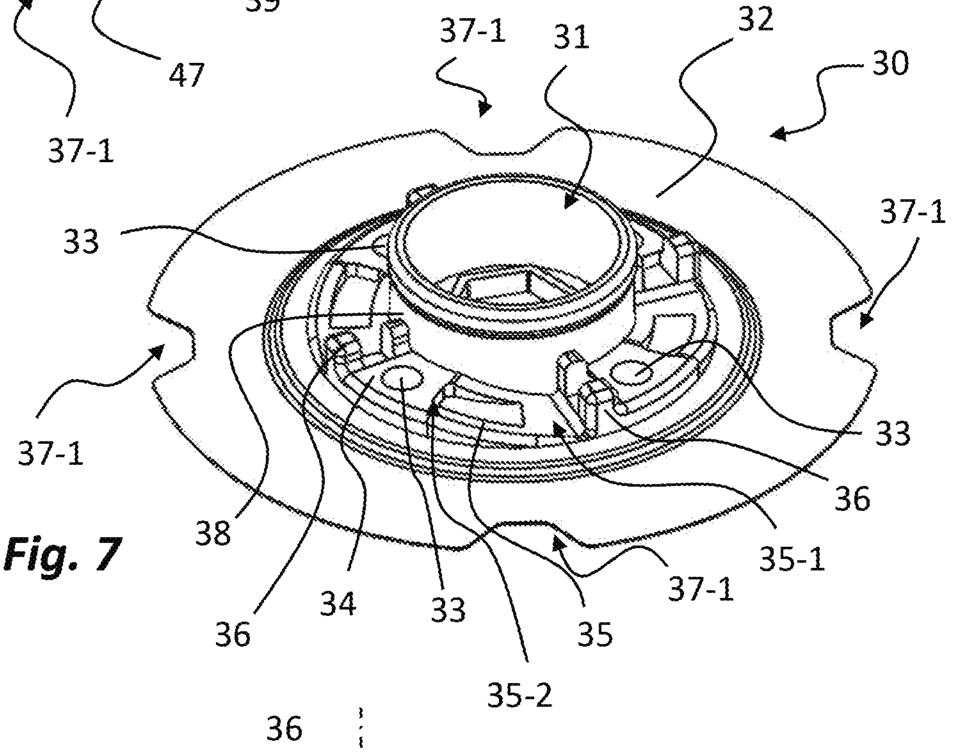
Figure 8:
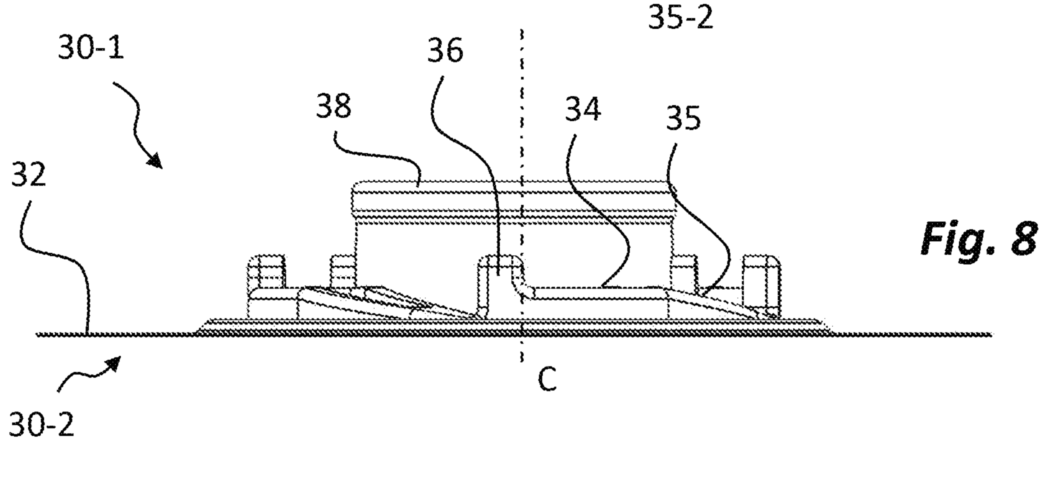
Figure 9:
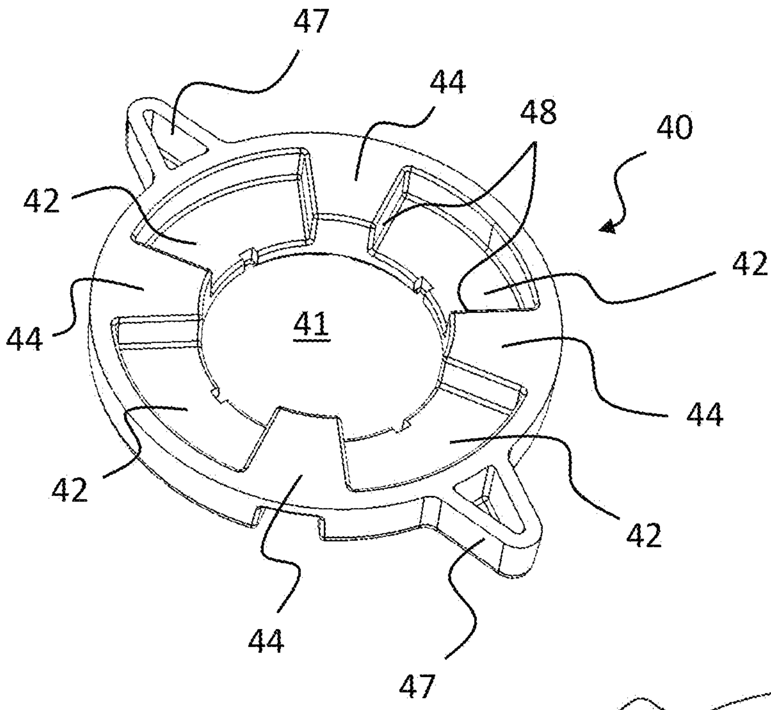
Figure 10:
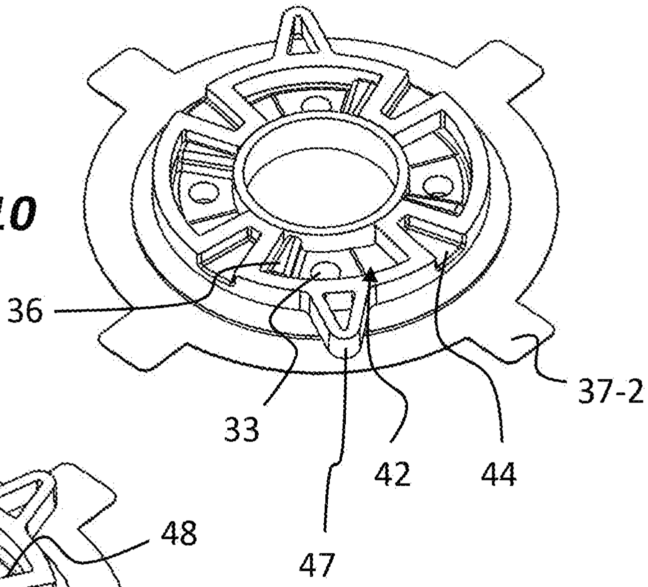
Figure 11:
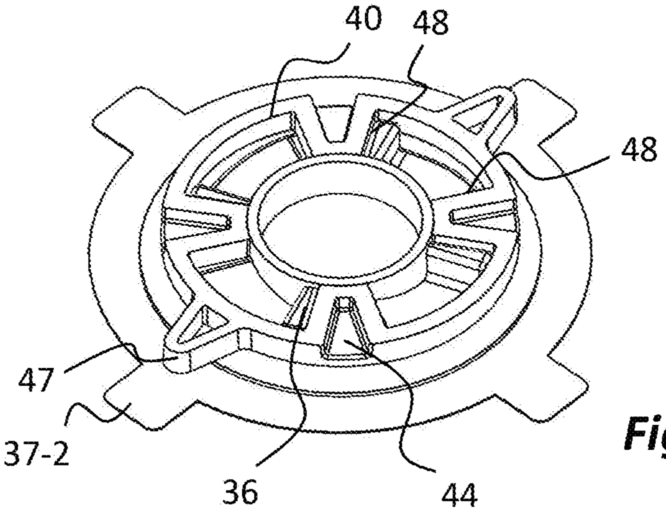
Figure 12:
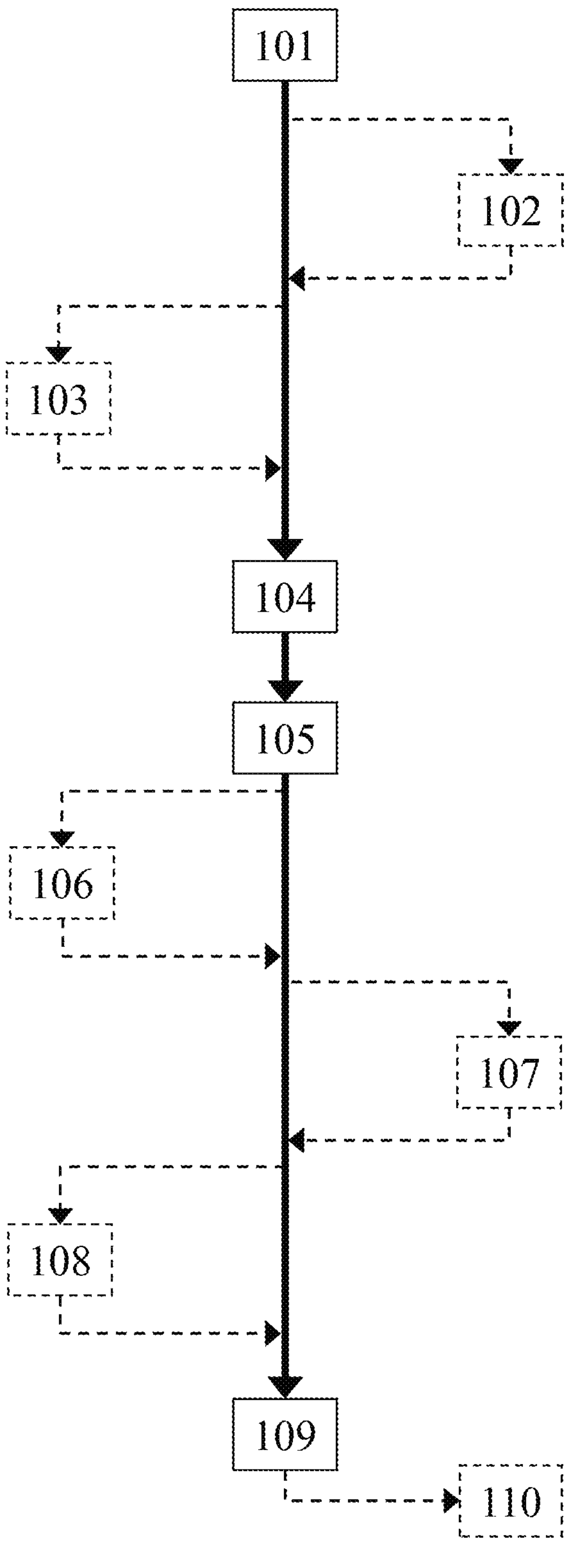
Figure 13:
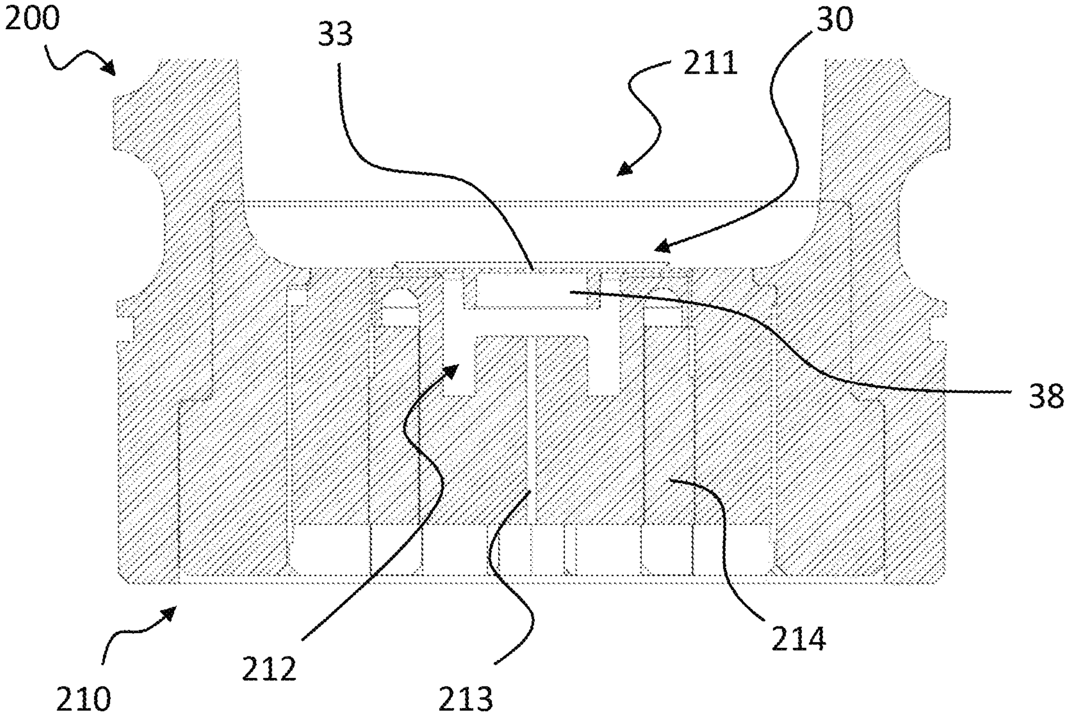
Figure 14:
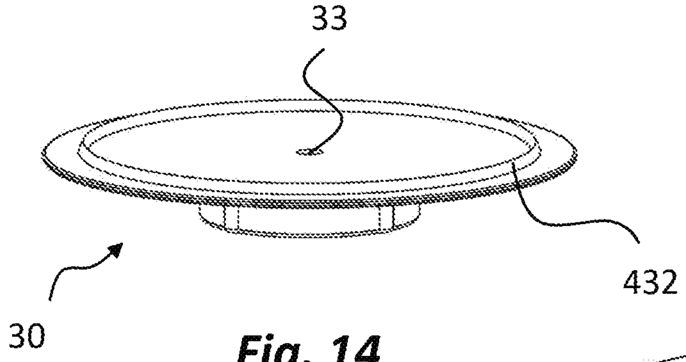
Figure 15:
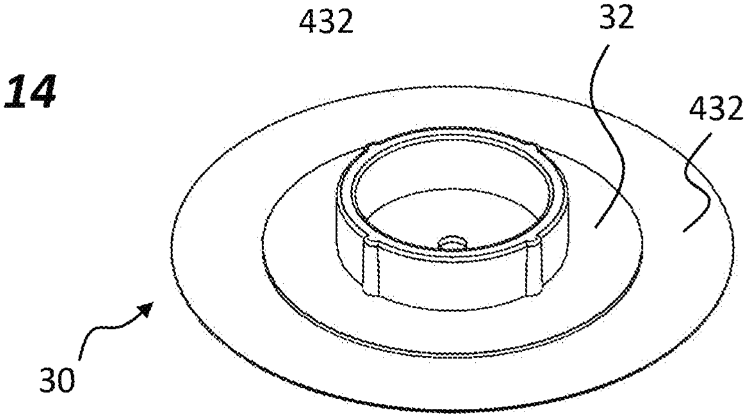
Figure 16:
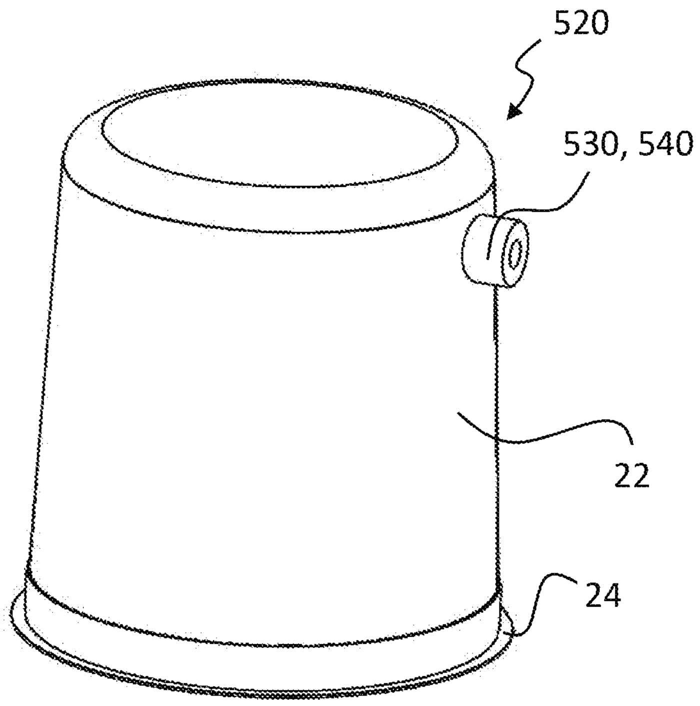
Figure 17:
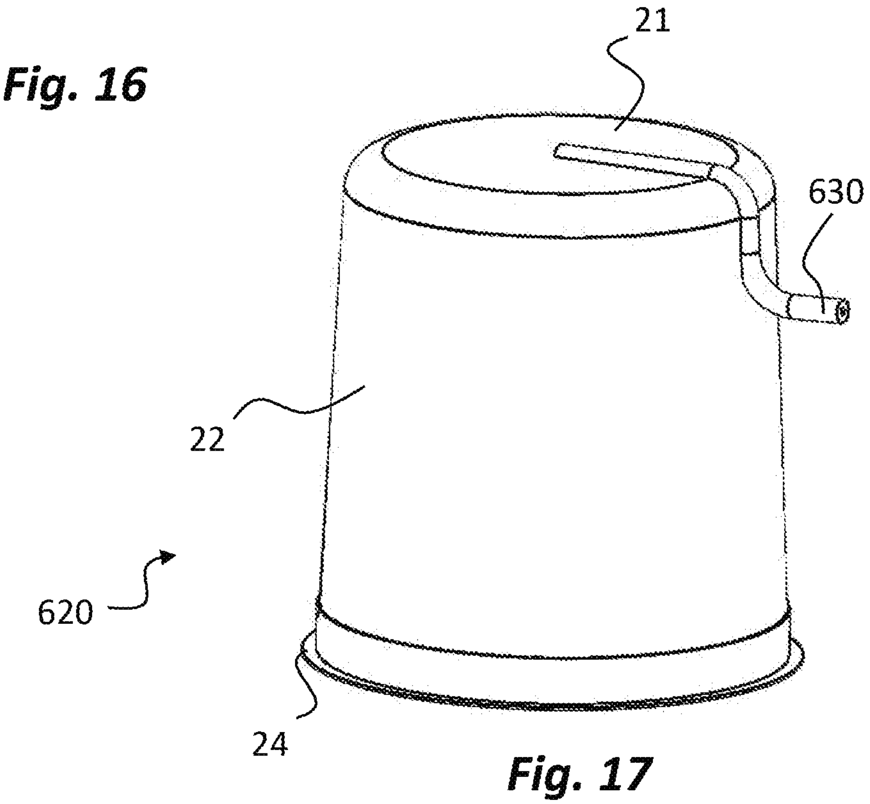
Figure 18:
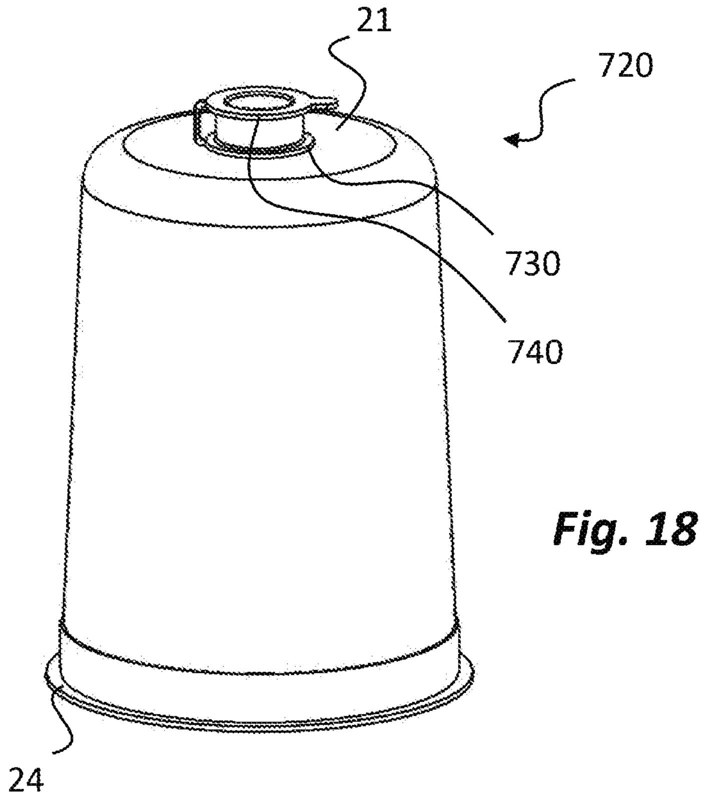
Figure 19:
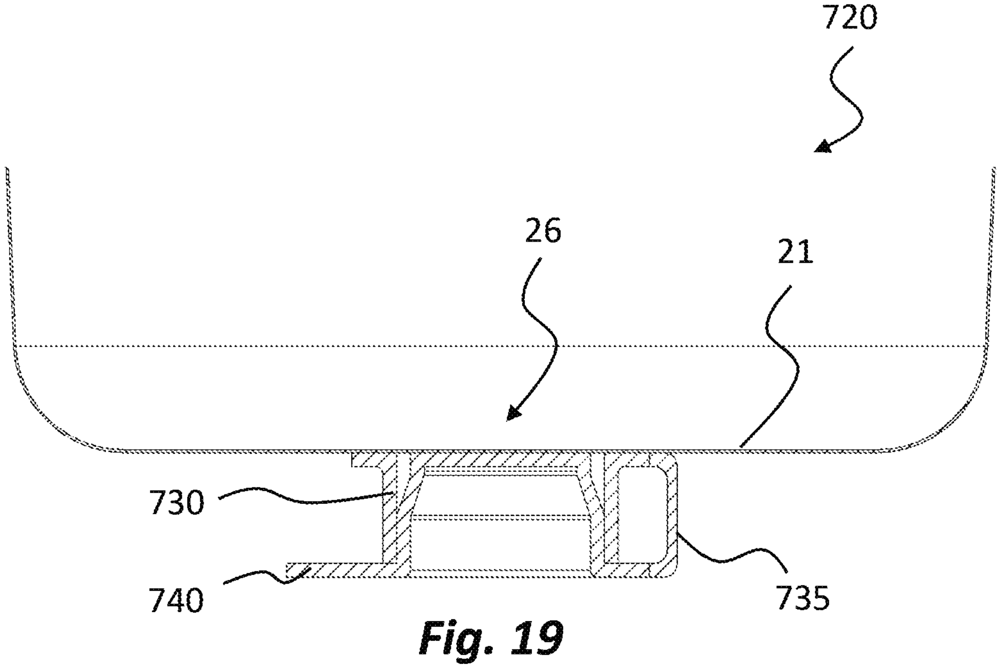
Figure 20:
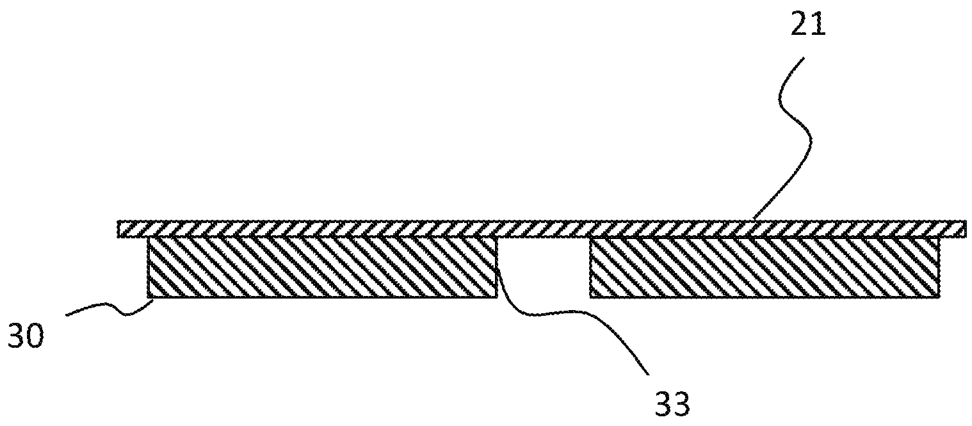
Figure 21:
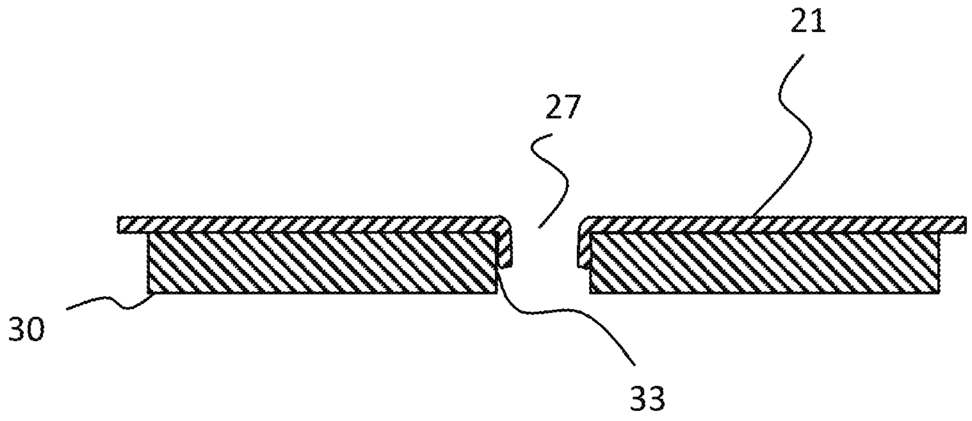

The appended figures that are described below disclose embodiments of the invention for illustrational purposes only. In particular, the disclosure provided by the figures is not meant to limit the scope of protection conferred by the invention. The figures are schematic drawings only and embodiments shown may be modified in many ways within the scope of the claims. The figures show:

FIG. 1 a perspective view of a fluid delivery assembly according to the present invention with the components of the assembly being shown exploded;

FIG. 2 a perspective view of the fluid delivery assembly of FIG. 1 in an assembled state;

FIG. 3 a perspective view of a lid and a screw-on collar of the fluid delivery assembly shown in FIG. 1;

FIG. 4 a perspective view of a container of the fluid delivery assembly shown in FIG. 1 having a valve assembly attached thereto;

FIG. 5 a top view of the container shown in FIG. 4;

FIG. 6 a perspective view of the valve assembly shown in FIGS. 1 and 4;

FIG. 7 a perspective view of a first element of the valve assembly shown in FIG. 6;

FIG. 8 a front view of the first element shown in FIG. 7;

FIG. 9 a perspective view of a second element of the valve assembly shown in FIG. 6;

FIG. 10 a cross section of the valve assembly shown in FIG. 6 with the second element in the opened position;

FIG. 11 a cross section of the valve assembly shown in FIG. 6 with the second element in the closed position;

FIG. 12 a flow chart of a method for forming a container according to the present invention;

FIG. 13 a cross section through a tool according to the present invention;

FIG. 14 a perspective view of a first element of a valve assembly according to the present invention with an optional rib;

FIG. 15 a perspective view of a first element of a valve assembly according to the present invention with an optional flash;

FIG. 16 a perspective view of a container for a fluid delivery assembly according to the present invention according to a first variation;

FIG. 17 a perspective view of a container for a fluid delivery assembly according to the present invention according to a second variation;

FIG. 18 a perspective view of a container for a fluid delivery assembly according to the present invention according to a third variation;

FIG. 19 a cross section through the container of FIG. 18;

FIG. 20 a schematic cross section of a container material and a first element prior to bursting a vent hole therethrough;

FIG. 21 a schematic cross section of a container material and a first element after bursting a vent hole therethrough.

Figure 22:
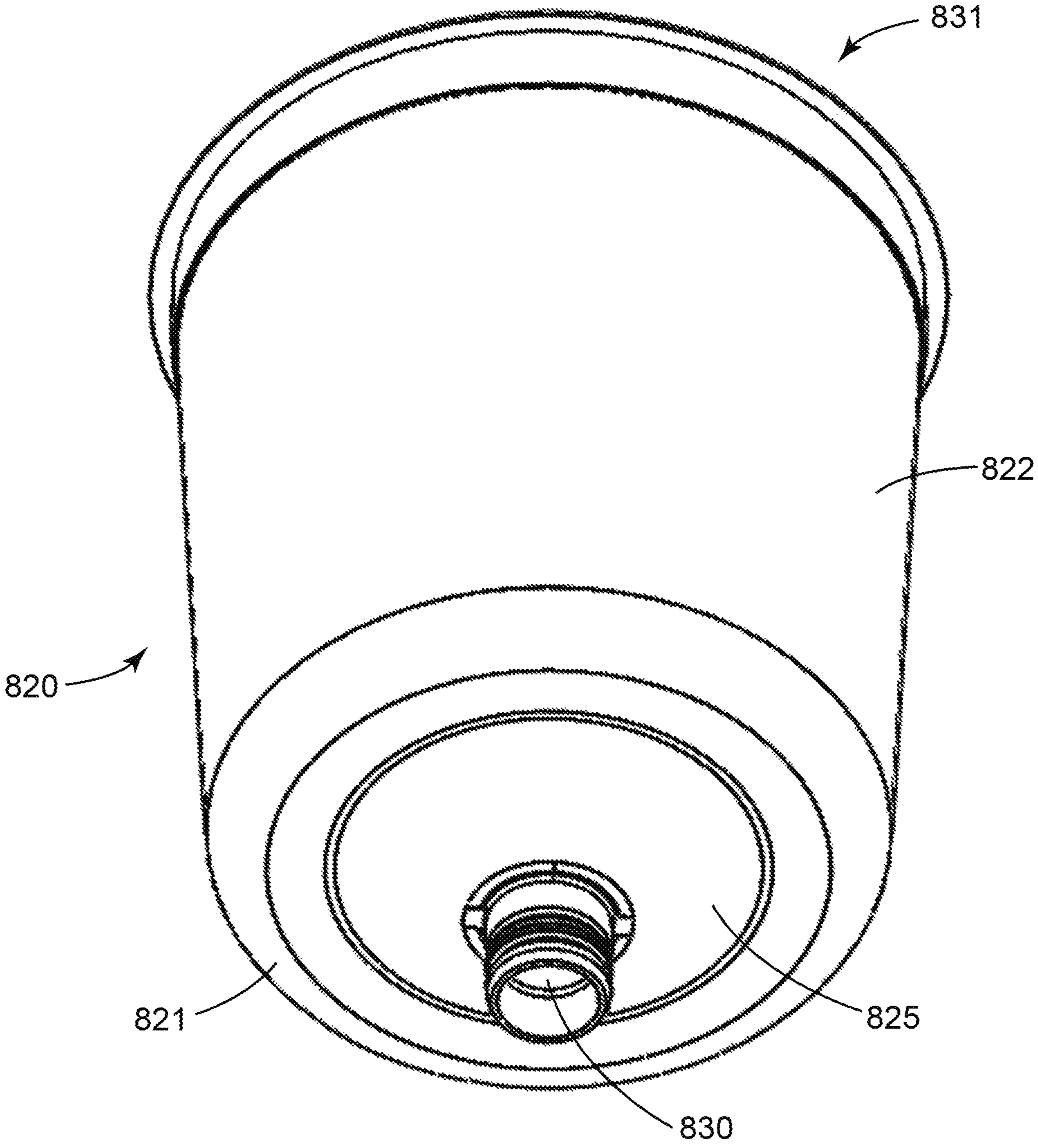
Figure 23:
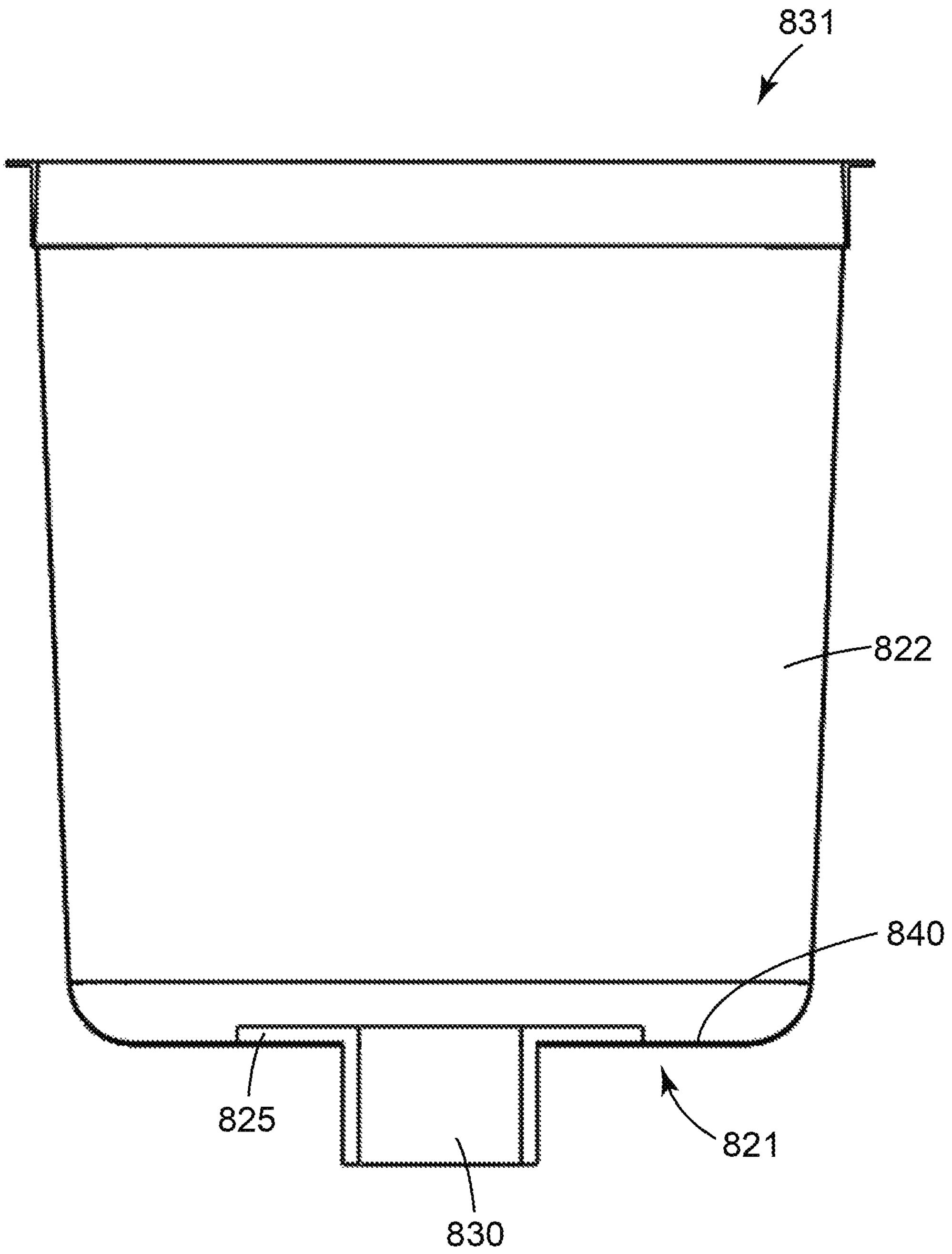
Figure 24:
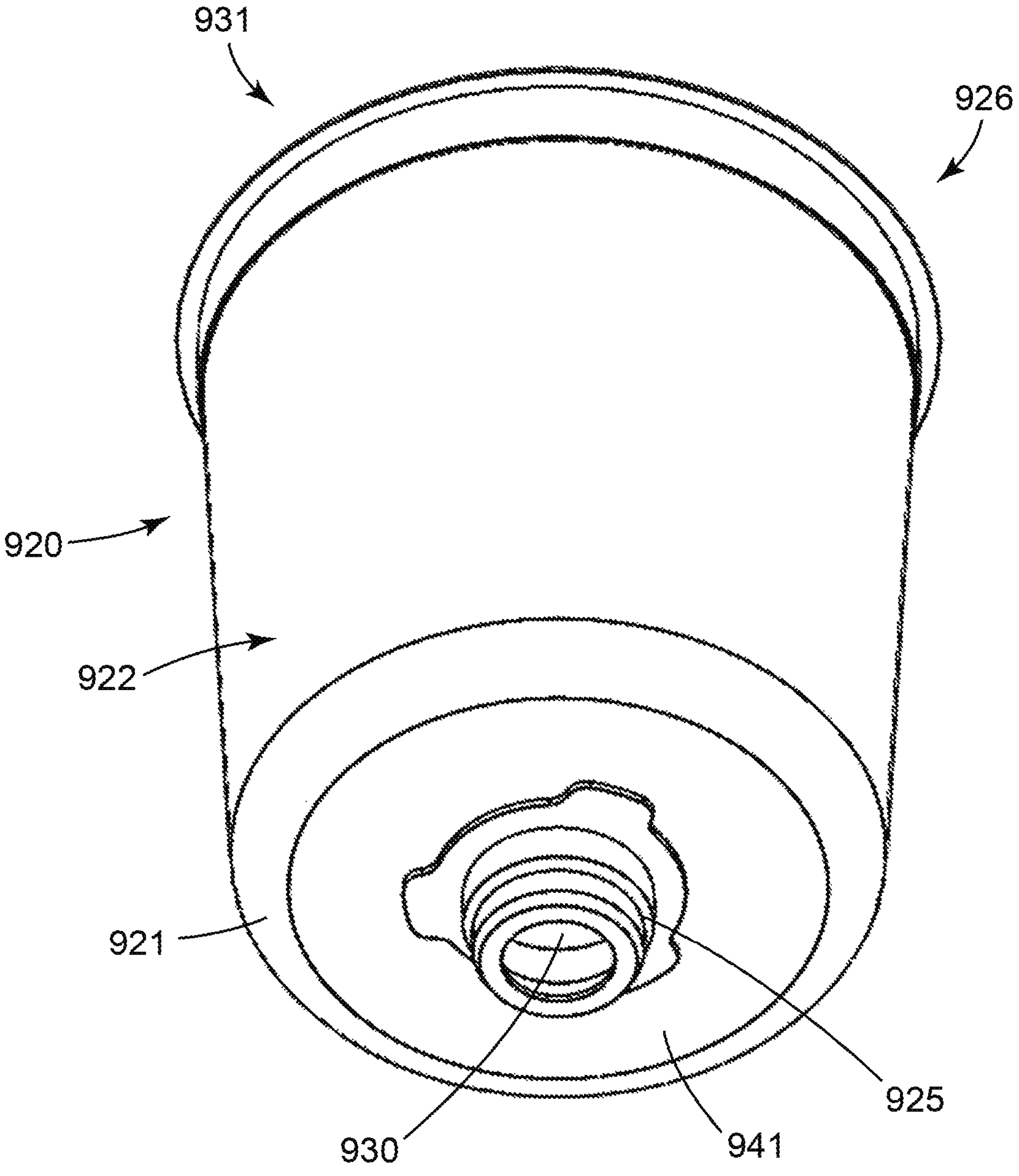
Figure 25:
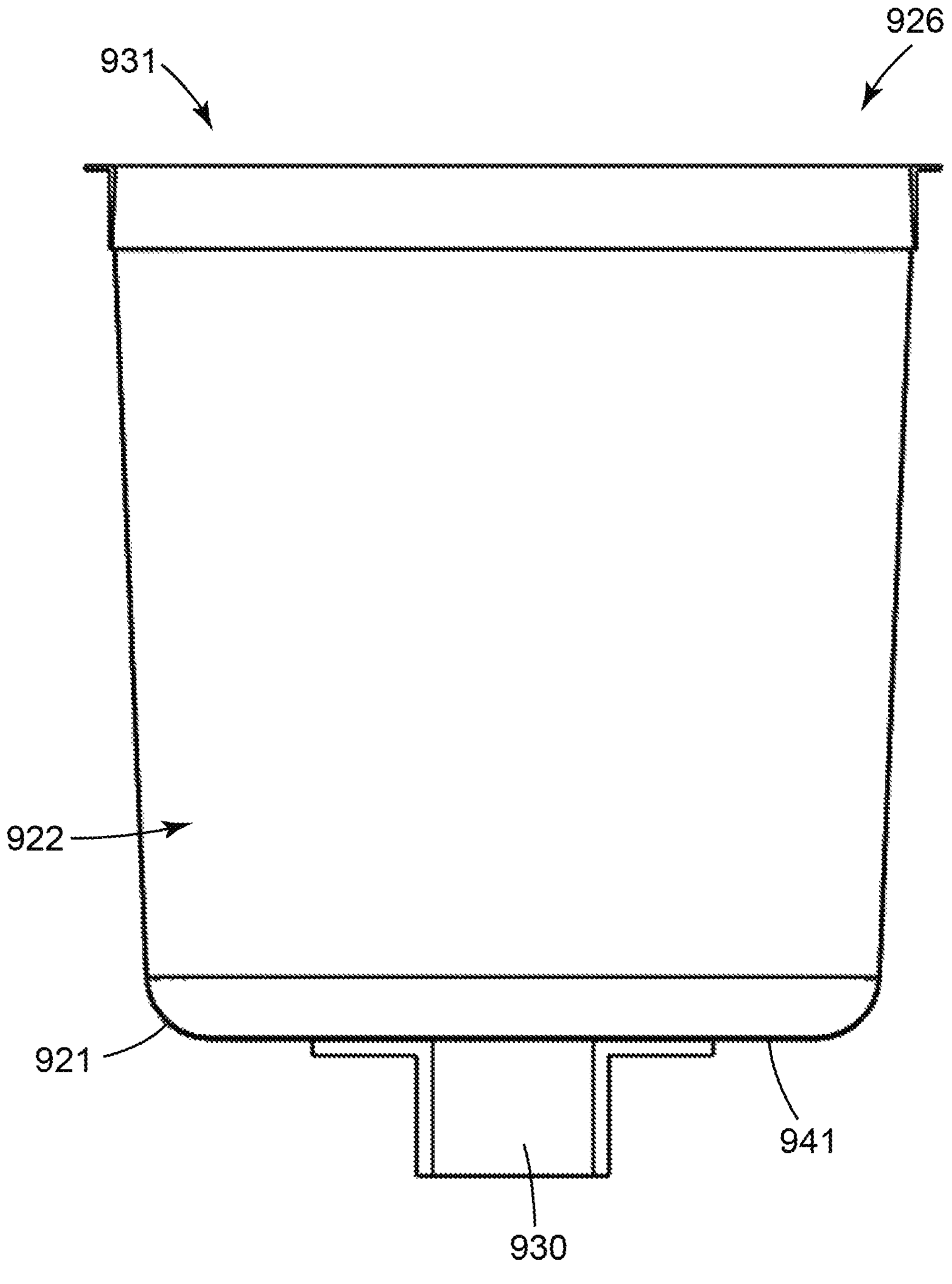
Figure 26A:
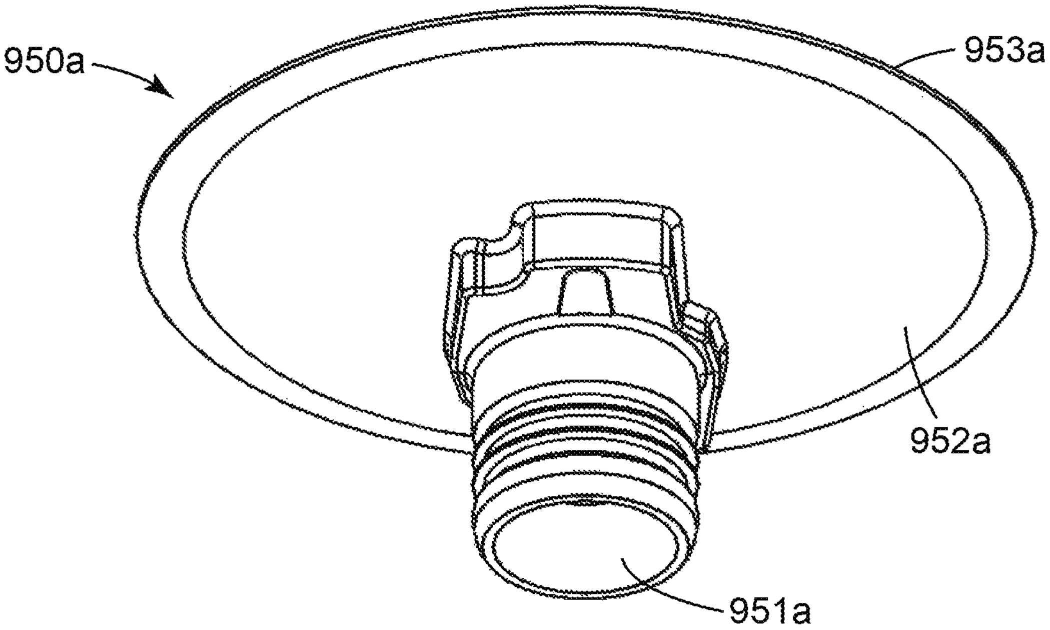
Figure 26B:
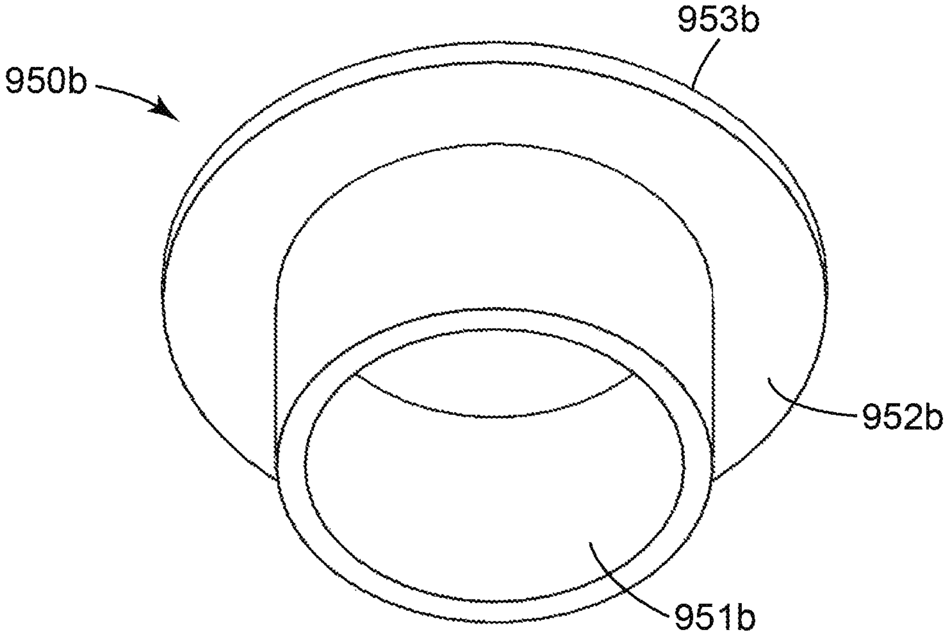
Figure 26C:
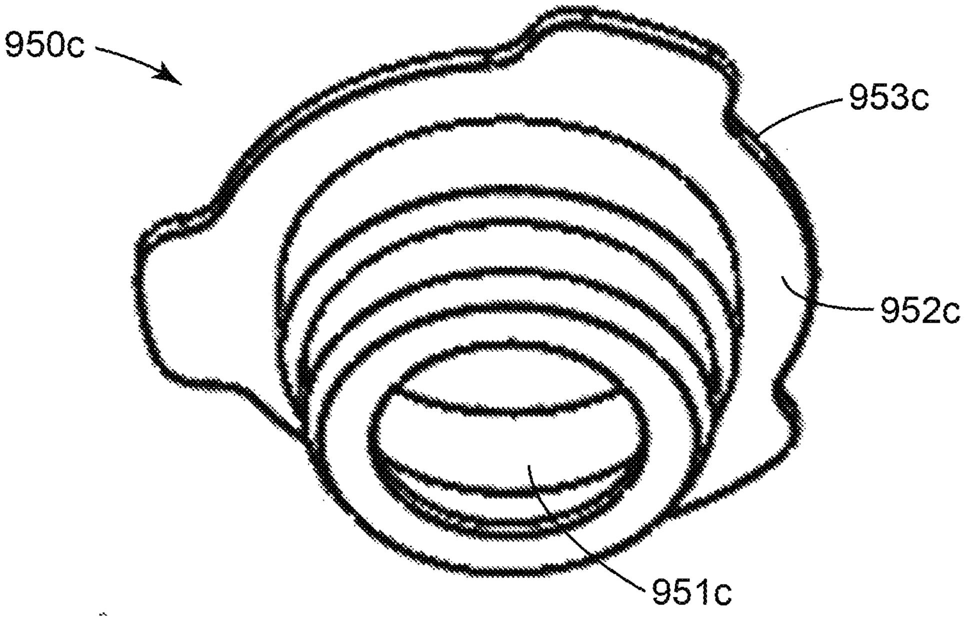
Figure 26D:
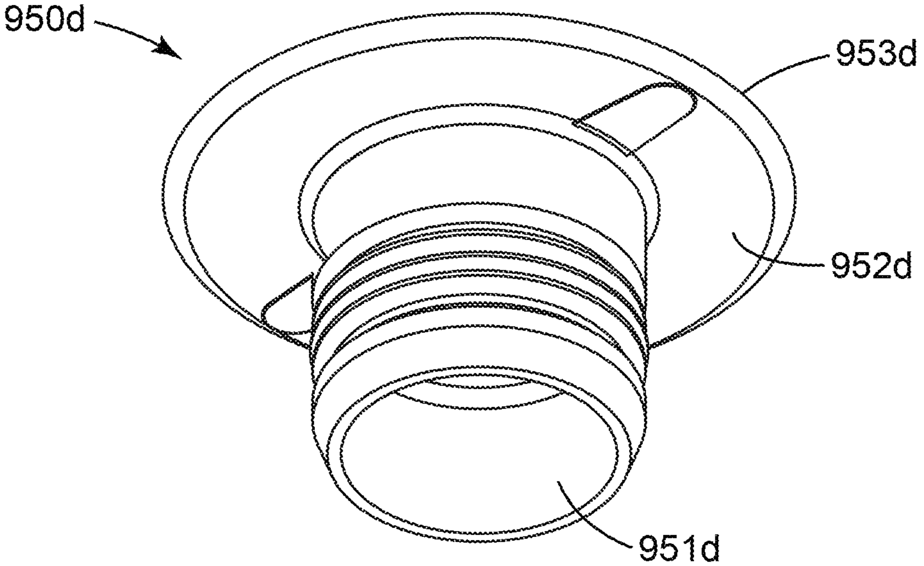

FIG. 22 a perspective view of a container of the fluid delivery assembly according to the present invention having a separate part fluid port attached thereto on the internal side of the base;

FIG. 23 a cross section view of the container shown in FIG. 22;

FIG. 24 a perspective view of a container of the fluid delivery according to the present invention having a separate part fluid port attached thereto on the external side of the base;

FIG. 25 a cross section view of the container shown in FIG. 24;

FIGS. 26*a*-26*d* perspective views of separate piece fluid ports for use in the present invention.

Figure 27:
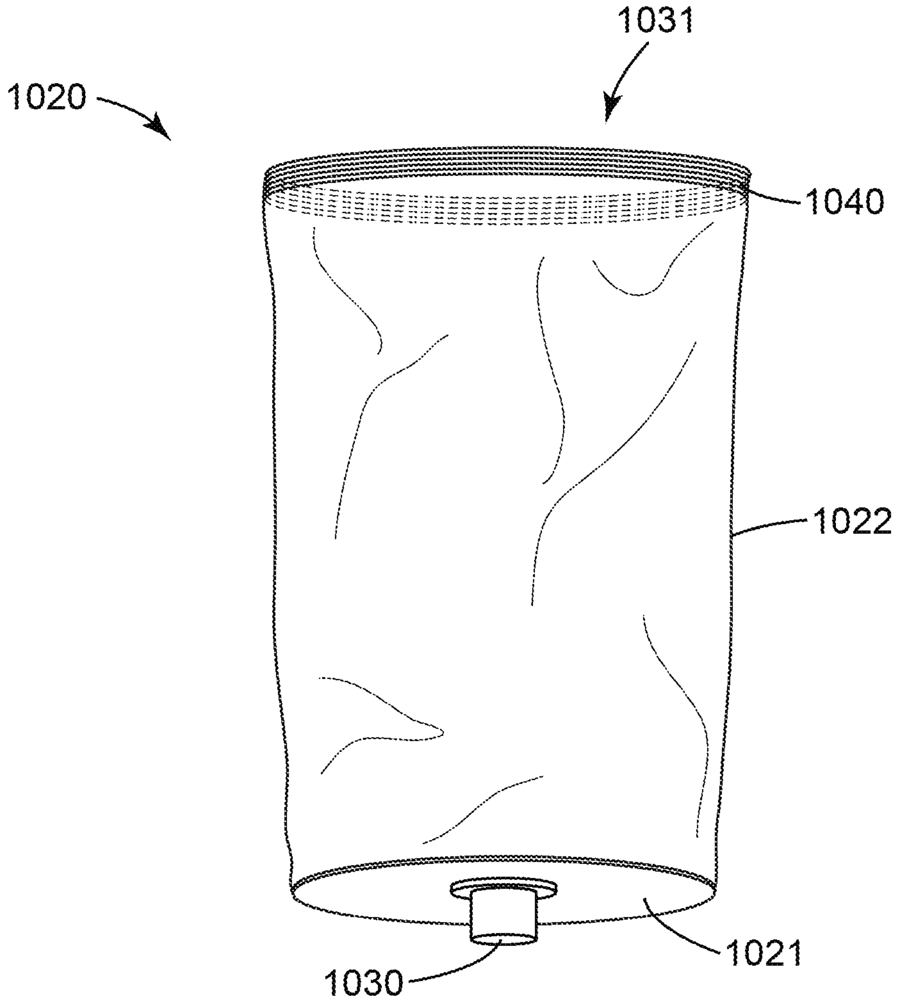

FIG. 27 a perspective view of a container of the fluid delivery according to the present invention having a separate part fluid port attached thereto and a sealing member integrated into the container.

DETAILED DESCRIPTION

FIG. 1 shows a fluid delivery assembly 1 according to the present invention. For reasons of clarity, the components of the assembly 1 are shown disassembled and the valve assembly 30, 40 is shown detached from the liner or container 20. The container 20 preferably has a container base 21 and container sidewalls, with a peripheral container sidewall 22 being exemplified in FIG. 1. The container may extend along a container longitudinal axis A. The container 20 may have a container top end, which may be open to allow for paint to be poured into the container 20. The sidewall 22 may have a circular or polygonal cross section. The sidewall 12 may be tapered, in particular slightly tapered, towards the base 21.

As shown in FIG. 1, the fluid delivery assembly 1 may comprise an outer cup 10 in which the container 20 may be placed in order to pour paint therein and/or for mixing. The outer cup 10 preferably has an outer cup base 11, but which could also be omitted. The outer cup base 11 may be configured to support the container base 21 along at least a portion thereof, for example to facilitate mixing of paint in the container. Furthermore, the outer cup 10 may comprise one or more sidewalls, with a peripheral sidewall 12 being exemplified in FIG. 1. The sidewall 12 may have a circular or polygonal cross section. The sidewall 12 may be tapered, in particular slightly tapered, towards the base 11. The outer cup 10 may have an outer cup top end 13, which may be open in order to allow the container 20 to be inserted therethrough into the outer cup 10.

The base of the container may be substantially flat, as shown in FIG. 1, but can also have other shapes such as dome-shaped.

The outer cup may be provided with one or more features for providing an engagement with a lid 50 and/or with a screw on collar 60 of the fluid delivery assembly 1. Such engagement can be provided, for example, by a threading 15 shown in FIG. 1, which in the exemplary assembly 1 illustrated in this figure is an external threading that is arranged at a top end portion of the outer cup sidewall 12. The threading 15 may be formed by a plurality of threading segments (e.g., 3, 4, 5 or 6 segments). Each segment preferably extends for an arc of less than 80°, less than 60°, less than 45°, or even less than 40° around the periphery of the outer cup 10. This may allow attaching the lid 50 and/or the screw on collar 60 to the outer cup 10 by a brief twist action, which may be quick and comfortable for a user to perform.

As further shown in FIG. 1, a cutout 16 may be provided in the outer cup base 11. Considering that the valve assembly 30, 40 preferably is attached and/or bonded to the container 20, the cutout 16 may be configured to allow the valve assembly 30, 40 to be accessed or protrude at least partially through the container base 11 (see also FIG. 2). In a bottom or top view, the cutout 16 may thus be configured to at least partially or entirely overlap and/or to at least partially or entirely encircle the valve assembly 30, 40 when the container 20 is inserted into the outer cup 10.

Alternatively or additionally, the outer cup 10 may comprise a cutout or slot in the outer cup sidewall 12. As shown in FIG. 1, such slot may extend along the sidewall 12 with a direction from a lower end region of the outer cup towards the outer cup top end 13, for example along an outer cup longitudinal axis B that may be generally congruent with the container longitudinal axis A. As the cutout 16 in the outer cup base 11, also the cutout or slot in the outer cup sidewall 12 may receive a valve assembly of the container 20 and/or allow such valve assembly to at least partially protrude therethrough. Such slot may thus be useful, for example, when a valve assembly is provided on the container sidewall 22 (see, for example, FIG. 16) and/or when the valve assembly extends radially outward from the container base 21 and/or the container sidewall 22 (see, for example, FIG. 17). The slot may have the longitudinal shape shown in FIG. 1 to allow the part of the valve assembly that protrudes therethrough to move with the container 20 when the container 20 collapses as fluid is withdrawn from the fluid delivery assembly 1.

The slot may comprise a first slot portion 17 and a second slot portion 18, with one slot portion being wider than the other. In particular, the first slot portion 17 may be wider than the second slot portion 18, wherein the first slot portion 17 may be a portion of the slot that is located closer to the lower end region of the outer cup than the second slot portion 18. This may facilitate insertion of the valve assembly through the slot when placing the container 20 in the outer cup 10. However, the width of the slot may also be constant or substantially constant.

As will be evident to the skilled reader, both the cutout 16 in the outer cup base and the cutout or slot 17, 18 in the outer cup sidewall 12 are optional features. As such, one or both of the cutout 16 and the slot 17, 18 may be omitted, if desired.

At a lower end region of the outer cup, one or more protrusions 14 may be provided in order to support the outer cup 10 on a support surface on which the outer cup 10 is placed (e.g., a workbench). The protrusions 14 may extend, for example, downwardly from the outer cup base 11. Such protrusions 14 may be helpful, for example, in case the valve assembly 30, 40 protrudes through the cutout 16.

The container 20 may be manufactured, for example, by thermo/vacuum forming. The container base 21 and the container sidewalls 22 may be integrally formed with each other. The container may, in some instances, be formed without seems along the base and/or without seams along the junction of the base with the sidewalls.

The container 20 may be shape self supporting. Moreover, the container 20 may be collapsible as fluid is withdrawn from the fluid delivery assembly 1. When the container 20 is in its original, non-collapsed state, the container sidewalls 22 may be devoid of pleats, in particular devoid of pleats extending along the sidewalls in a direction from the lower end region of the outer cup towards the container top end 23 (e.g., pleats extending in a direction generally parallel to the container longitudinal axis A). Alternatively or additionally, the container base 21 may be devoid of pleats when the container 20 is in its original, non-collapsed state, in particular devoid of pleats extending across the container base 21. Although it generally not desirable to trap paint in the container (such as may occur with a pleat), certain internal features may be tolerable or even beneficial if such features, for example, promote mixing of paint. Also, such features—even if not particularly beneficial for paint mixing, etc.—may be less problematic for materials with fewer components to mix, as there is less likelihood of a critical component being trapped and therefore remaining unmixed.

The shape of the container sidewall 22 and/or the shape of the container base 21 may generally correspond to the shape of the outer cup sidewall 12 or to the shape of the outer cup base 11, respectively. If desired, the container 20 may be a close fit within the outer cup 10. The shape of the container sidewall 22 may also deviate from the shape of the outer cup sidewall 12. Moreover, the shape of the container base 21 may deviate from the shape of the outer cup base 11.

The container top end 23 may be at least partially or entirely surrounded by a container rim 24. The material thickness of the container rim may be greater than the material thickness of the container base and/or greater than the material thickness of the one or more container sidewalls. The container 20 may in some case be supported in the outer cup 10 via the container rim 24. In the exemplary embodiment shown in FIG. 1, the container rim 24 may lie on a top edge of the outer cup 10, which may be formed by the uppermost end of the outer cup sidewall 12 and/or by one or more protrusions and/or by one or more recesses provided in said outer cup sidewall 12. It should be noted, however, that the container 20 may also be supported in different manners and the container rim 24 may thus be omitted. The width of the container rim 24 may be adjusted as desired. In some cases, it may be preferably that the container rim 24 is narrow, i.e., it may have a width of less than 7 mm, or less than 5 mm, or less than 3 mm.

As further shown in FIG. 1, the container may comprise a vent 26. In the exemplary embodiment that is illustrated in this figure, the vent 26 is provided in the container base 21. As shown, the vent 26 may be provided by one or more through holes 27 extending through the container base. In the embodiment of FIG. 1, four through holes 27 are shown to be arranged at a central portion of the container base 21 (with only one of these through holes being referenced for reasons of clarity). While it has been found that adequate results may be provided, for example, when using four through holes 27 with a diameter of approximately 2 mm each, it will be apparent to the skilled reader that the number, shape, diameter and/or location of such through holes may be varied (for example, 1, 2, 3, 5 or 6 or more through holes may be also be suitable). The vent 26 (i.e., preferably all through holes 27) may be covered by the valve assembly 30, 40.

FIG. 2 shows the fluid delivery assembly of FIG. 1 in its assembled state with the container 20 being inserted into the outer cup 10. As apparent from FIGS. 1 and 2, the container top end 23 may be covered and/or at least partially closed by attaching the lid 50 thereto. The lid 50 comprises a fluid outlet 51 that is adapted to be connected to a fluid inlet of the spray gun (not shown), in particular to the fluid inlet of a gravity fed spray gun. The lid 50 preferably is removable from the container 20 and/or from the outer cup 10. In the exemplary embodiment shown, the lid 50 is attached to the outer cup 20 via a screw-on collar 60, but it will be apparent to those of skill in the art based on the description provided above that also other means may be relied upon for this purpose.

As further apparent from FIG. 2, the valve assembly 30, 40 of the exemplary embodiment is bonded to the container base 21 in the region of vent 26 and protrudes through the cutout 16 in the container base.

FIG. 3 shows the lid 50 and the screw-on collar 60 in more detail. To seal with the container top end 23 in a liquid-tight and/or air-tight manner, the lid 50 may comprise a sealing arrangement, which in the exemplary embodiment shown is provided by a cylindrical section 55 of the lid 50 that extends into the container top end 23. The cylindrical section 55 of the lid 50 may carry one or more annular ribs or protrusions 57 that may seal with the container 20, for example with the container sidewall 22. Additionally or alternatively, the lid 50 may include a peripheral flange 56. The peripheral flange 56 may be pressed onto the container 20 when the lid 50 is assembled thereto, for example onto the container rim 24. The contact between the peripheral flange 56 and the container 20 (in particular, with the container rim 24) may provide for an additional seal. The cylindrical section 55 and/or the protrusions 57 may be omitted if the seal of the flange is sufficient and vice-versa.

As noted above, the lid may comprise the fluid outlet 51, which may be provided in a central portion of the lid 50. The cylindrical section 55 and/or the peripheral flange 56 may be provided in a peripheral portion of the lid 50. The central and peripheral portions may be connected by a transverse portion.

The lid 50 may be provided with a coupling for attaching the lid to a spray gun and/or to an adapter connected to such spray gun. Such coupling may be provided by a screw thread, for example an external screw thread provided on the fluid outlet 51. Alternatively or additionally, the lid may comprise a quick-connection coupling means, which may be non-threaded. For example, hook coupling means with hooks 53 may be integrally formed with the lid 50. The hooks 53 may be formed along the transverse portion of the lid 50, as exemplified in FIG. 3. The hooks 53 may be arranged externally of the fluid outlet. For example, the hook coupling means may be radially spaced from said fluid outlet by a predetermined distance. The hooks 53 are preferably provided with inwardly projecting lips, i.e. preferably lips extending towards the fluid outlet 51.

As shown in FIG. 1, the screw on collar 60 of the present invention may be attached to the lid 50, in particular snap-fitted to the lid 50. As such, even when the lid 50 is disassembled from the outer cup 10 and/or from the container 20, movement of the collar 60 with respect to the lid 50 may be limited, in particular to a rotational movement between the lid 50 and the collar 60 (as long as the collar 60 is not detached from the lid 50). For example, as illustrated in more detail in FIG. 3, the collar 60 may be snap-fitted between the peripheral flange 56 of the lid 50 and one or more holding protrusions 58, 59 extending from the lid's peripheral portion. The collar 60 may remain rotatable with respect to the lid 50 when snap-fitted and can be provided with a threading 61, which in the exemplary collar 60 illustrated in FIG. 3 is an internal threading. As shown in FIG. 3, the threading 61 may be formed by a plurality of threading segments (e.g., 3, 4, 5 or 6 segments), each of which preferably extends for an arc of less than 80°, less than 60°, less than 45°, or even less than 40° around the periphery of the collar 60. The threading 61 may engage with the threading 15 of the outer cup 10.

However, it will be apparent to the skilled reader that the lid may be connected to the container and/or to the outer cup in various other manners. Therefore, the use of a screw-on collar is not necessarily required. For example, the lid may be snap-fitted to the container and/or snap-fitted to the outer cup. Alternatively or additionally, the lid may be screwed onto and/or into the outer cup and/or the container. Even further, the lid may be screwed onto the container and/or into the outer cup via a threading provided in an additional holding collar (not shown in the figures).

The lid 50, in particular the lid's peripheral portion, may be provided with a first lid stop feature to limit rotation of the collar 60 with respect to the lid in a first direction and/or with a second lid stop feature to limit rotation of the collar 60 with respect to the lid 50 in the opposite, second direction. In the exemplary embodiment shown in FIG. 3, these lid stop features are provided by a first and a second of the holding protrusions 58, 59, respectively. The collar 60 may comprise a corresponding collar stop feature to limit rotation of the collar 60 with respect to the lid 50, which in the exemplary embodiment is a protrusion 68 of the collar 60. Depending on the design chosen, the protrusion 68 may be configured to abut with the first holding protrusion 58 when the collar 60 is fully attached and/or with the second holding protrusion 59 when the collar 60 is fully detached from the outer cup 10.

FIG. 4 shows the container 20 with a first element 30 of the valve assembly bonded to the container base 21 and a second element 40 of the valve assembly attached to the first element 30. FIG. 5 shows a top view of the container 20 wherein the, preferably four, vent holes 27 of the vent 26 provided in the container base 21 (only one vent hole 27 being references for clarity reasons) can be seen through the open container top end 23.

FIG. 6 shows the valve assembly with the second element 40 attached to the first element 30. FIG. 7 shows the first element 30 with the second element 40 being detached while FIG. 8 shows a side view of said first element 30. FIG. 9 shows a bottom view of the second element 40 when being detached from the first element 30. FIGS. 10 and 11 show cross sections through the valve assembly when opened and closed, respectively.

As apparent from FIGS. 6 to 11, the second element 40 may be generally ring-shaped and may thus also be referred to as a vent ring. The ring can have a central opening 41 by means of which it can be snap-fitted to an attachment portion 31 of the first element 30, in particular to an attachment protrusion 38 provided in said attachment portion 31. The first element 30 may comprise a flange 32 that extends from said attachment portion 31 in order increase the contact surface with the container 20 when bonding the first element 30 to the container 20. The flange 32 may be substantially circular and/or may surround the attachment portion 31 to make it easier to achieve an adequate seal around the entire vent 26. The thickness of the first element 30 may be reduced in the region of the flange 32 when compared to other portions of the first element 30 (e.g., the attachment portion).

The first element 30 may comprise a duct 33 with a first end that is open to a first side 30-1 of the first element 30 and a second end that is open to a second side 30-2 of the first element 30. In the exemplary embodiment shown in FIGS. 1 to 11, four ducts 33 are provided, each being formed by a through hole extending through the first element 30. It will be evident, however, that also different numbers of ducts 33 can be relied on in this context. The number of ducts 33 preferably corresponds to the number of through holes 27 that form the vent 26. The first end of each duct 33 may form a substantially continuous air path with a respective vent hole 27.

The second end of the ducts 33 may be sealed when the valve assembly is closed. In particular, the second end of each duct 33 may end in a seal seat surface 34 of the first element 30 and may be sealed by the second element 40 when the second element 40 is moved into a closed position. For this purpose, the second element 40 may comprise one or more sealing surfaces 44 (see FIG. 9), each of which may be formed by and/or provided on a respective protrusion of the second element 40. The sealing surfaces 44 may be pressed onto the seal seat surfaces 34 when the second element 40 is moved into the closed position shown in FIG. 11. As shown, for example, in FIG. 9, the sealing surfaces 44 and/or the respective protrusions each may extend circumferentially along a segment of the vent ring.

When the valve assembly is opened, the second end of the ducts 33 may be open and/or may be exposed to surrounding atmosphere. For this purpose, the second element 40 may comprise respective openings or recesses 42, each of which may be located such that it overlaps the second end of a duct 33 when the second element 40 is moved into the opened position shown in FIG. 10. As shown, for example, in FIG. 9, the openings or recesses 42 each may extend circumferentially along a segment of the vent ring. Each sealing surface 44 may be located between two of the recesses 42 and vice-versa.

In the exemplary valve assembly illustrated in FIGS. 6 to 11, the second element 40 is configured to be moved from the open position to the closed position with a directional component along a longitudinal axis C of the first element 30. More specifically, the second element may be configured to be moved away from the first side 30-1 of the first element 30, in particular when rotated. For this purpose, the first element 30 may comprise at least one ramp 35. In the illustrative embodiment, four ramps 35 are included (one for each seal seat surface 44), but also more or less ramps may be used. The plurality of ramps 35 may extend in an annular manner, for example around the attachment protrusion 38. For example, each of the ramps 35 may extend along a segment of a circle, as shown in FIG. 7.

The ramps 35 may extend from a ramp start region 35-1 to a ramp end region 35-2, wherein the seal seat surface 34 may be provided subsequently to the ramp end region 35-2. The seal seat surface 34 may be adjacent to the ramp end region 35-2. The seal seat surface 34 may be contiguous with the ramp end region 35-2 or spaced therefrom.

In the illustrative embodiment shown, the ramp end region 35-2 is spaced further from the first side 30-1 than the ramp start region 35-1 along the longitudinal axis C. However, this arrangement could also be inverted, if desired.

The second element 40, in particular the protrusions of the second element 40 with the sealing surfaces 44, may be configured to slide along the ramps 35 when the second element 40 is rotated with respect to the first element 30. For example, a clockwise rotation of the second element 40 from the open position shown in FIG. 10 will result in the second element 40 being lifted from the first element 30. Since the second element 40 still remains retained on the attachment protrusion 38 the sealing surfaces 44 will be pressed onto the seal seat surfaces 34 when the second element reaches the closed position shown in FIG. 11.

The valve assembly may comprise at least one first stop feature for limiting rotation of the second element 40 in the closed position and/or at least one second stop feature for limiting rotation of the second element 40 in the open position. The first and/or second stop features may be provided, for example, by one or more stop protrusions 36 of the first element 30 (see FIGS. 7 and 8). As apparent from FIGS. 10 and 11, the stop protrusions 36 preferably abut with sidewalls 48 of the recesses 42 of the second element 40 when the second element 40 is in the open and closed positions. Such stop features may allow to limit the rotation of the first element 30 with respect to the second element 40 to less than 360°, preferably less than 180°, more preferably less than 90°, and even more preferably less than 80°.

As also apparent from FIGS. 6, 7, and 9, the first and/or second elements 30, 40 may be provided with first and/or second indication features, respectively, for indicating the relative position of the first and second elements 30, 40 to the user. This may allow the user to assess, in particular, whether the valve assembly is opened or closed. In particular, the valve assembly may be configured such that the positions of the first and second indication features match when the assembly is closed or opened.

In the exemplary embodiment shown in FIGS. 6 and 7, the first indication features are provided by indication recesses 37-1 formed in the flange 32. However, also other indication features may be envisaged, such as tabs 37-2 extending from the flange (see FIGS. 10 and 11) or marks (e.g., lines or dots) that could be formed on the first element 30 and/or on the container 20. The second indication features may be formed by projections or wings 47 that extend radially outwardly from the second element 40. However, also in this case, other configurations may be considered, such as indications recesses or marks. The first and/or second indication features preferably can be recognized with the naked eye.

As shown in FIGS. 6 and 7, the first element 30 may be provided with a rotation restriction feature 39 to limit rotation of the first element 30 in a thermo/vacuum forming tool. In an exemplary manner, a hexagonal cavity for receiving an Allen-shaped protrusion is shown in these figures. A rotation restriction feature 39 may be omitted if, for example, cavity pressure is already sufficient to retrain the first element against rotation.

FIG. 10 shows the valve assembly with the second element 40 in the open position. As will be appreciated, the ducts 33 are overlapped by the recesses 42 and thus connected to ambient air pressure. FIG. 11 shows the valve assembly with the second element 40 in the closed position. As will be appreciated, the ducts 33 are covered by the sealing surfaces 44 and are thereby sealed. The first indication features (e.g., wings 47) point towards two of the second indications features (e.g., tabs 37-2 provided at the flange), thereby indicating to the user that the valve assembly is closed.

With reference to FIGS. 12 and 13, a method of forming a vented container according to the present invention and a tool according to the invention which may be employed in such method will be discussed. While some of the reference signs used with respect to the embodiment described above are repeated in the description of the method below, it should be noted that the method described is not limited to the embodiment and may be employed for various containers, including different variations and types of containers shown in the figures and/or described herein.

As indicated by the flow chart of FIG. 12, the method may include a step 101 of providing a sheet of polymeric material, a step 104 of inserting said sheet of polymeric material into a thermo/vacuum forming tool 200 (see FIG. 13), a step 105 of thermo/vacuum forming the sheet into the shape of the container 20, and a step 109 of removing the container 20 from the thermo/vacuum forming tool 200. In step 105, the sheet may be heated to a softened condition (e.g., to its thermoplastic softening point) and may be formed into the desired shape, as defined by the tool 200, while in that softened condition. In particular, differential air pressure may be used to assist in forming the sheet into the container 20. For example, pressure may be produced along a first surface of the sheet and/or vacuum may be may be produced along a second surface of the sheet to assist in forming the sheet into the shape of the container 20.

As indicated by step 102 in FIG. 12, the sheet may, optionally, be provided with a hole or slit. Such hole or slit may be provided to the sheet, for example, before it is inserted into the thermo/vacuum forming tool in step 104 or, alternatively (not shown in FIG. 12) after it is inserted into the thermo/vacuum forming tool in step 104 and before the sheet is formed into the container 20 in step 105.

As indicated by step 103 in FIG. 12, a closure for the vent (e.g., a separate piece of film) and/or a first element 30 of a valve assembly may, optionally, be placed in the thermo/vacuum forming tool 200, in particular into a first cavity 211 configured to shape the container and/or into a second cavity 212, which may both be provided in a female mold member 210 of such tool 200 (see FIG. 13). As shown in FIG. 13, at least a portion of the sidewall of the first cavity 211 may be formed by the first element 30. The first element 30 may at least partially extend into the first cavity in order to be embedded into the material forming the container base 21 and/or into the material forming the container sidewall 22. In case a closure device, such like a film (not shown in the figures), is provided, at least a portion of the sidewall of the first cavity 211 may be formed and/or covered by said film.

The closure for the vent and/or the first element 30 of the valve assembly is preferably inserted into the tool 200 before thermo/vacuum forming the sheet into the container step in 105. As shown in FIG. 12, the closure for the vent and/or the first element 30 of the valve assembly may be placed in the tool 200 before inserting the sheet therein in step 104. It should be noted, however, that step 103 could also be performed after step 104, for example if the sheet of polymeric material is inserted into and/or placed on a second mold member (not shown in the figures) of the tool 200 (e.g., a male mold member) before the tool 200 is closed. The closure for the vent and/or the first element 30 of the valve assembly is preferably placed in the female mold member 210 before the cavity 211 of the female mold member 210 is covered with the sheet and the thermo/vacuum forming of the sheet begins (step 105). The first side 30-1 of the first element 30 may face towards the first cavity 211.

In accordance with the description provided above, the first element 30 may be pre-heated before it is placed in the tool 200 and/or may be heated in the tool 200 by means of a heating element for example a glass rope heating element 214.

As shown in FIG. 13, the second cavity 212 may at least partially receive the first element 30. In particular, the second side 30-2 of the first element 30 may face towards the second cavity 212 and the second cavity 212 may receive, inter alia, the attachment protrusion 38.

While not shown in FIG. 13, also the second element 40 may be inserted into the tool 200, for example with the first element 30 (e.g., attached to the first element 30) or before the first element 30. The second element 40 may be in the opened position shown in FIG. 10 in this case to facilitate the bursting in step 107 that is described below. The second element 40 may be received in the second cavity 212 in this case.

As indicated at 106, the method may, optionally, include a step of bonding the closure and/or the first element 30 of the valve assembly to the container 20, in particular to the container base 21 and/or to the container sidewall 22. As will be understood by the skilled reader from the discussion provided above, the bonding in step 106 may occur towards the end of the thermo/vacuum forming step 105, i.e. when the sheet has been deformed to contact the first cavity 211 and, in particular, to contact the closure and/or the first element 30 placed in said first cavity in step 103. It has been found in this context that adequate bonds can be provided, for example, when combining a sheet made of polyethylene (e.g., low density polyethylene) with a first element made from polyethylene.

As indicated at 107, the method may further include a step of bursting (or blowing) the vent 26 through the container 20, in particular a step of bursting one or more through holes 27 through the container base 21 and or through the container sidewall 22 at one or more pre-determined locations. Step 107 may be performed after forming the sheet into the container in step 105 and/or after bonding the first element 30 to the container 20 in step 106. This may allow to create the vent holes 27 exactly at the location where the ducts 33 are open on the first side 30-1 of the first element 30. Adequate through holes can be obtained, for example, at 103.42 and 206.84 kPa (15 and 30 psi). Without wanting to be bound by theory, it is believed that suitable differential pressures between the first side of the sheet and the second side of the sheet—depending on material choice, material thickness, material temperature, number of holes, and/or size of the hole(s), etc.—may be 3 psi or more, 5 psi or more, or 10 psi or more. Alternatively or additionally, the differential pressure between the first side of the sheet and the second side of the sheet preferably is 80 psi or less, 60 psi or less, or 50 psi or less. For example, pressure ranges of 3 to 70 psi or 5 to 50 psi may be employed. Schematic representations of a portion of a container 21 before and after having a vent hole burst therethrough are depicted in FIGS. 20 and 21, respectively.

As shown in FIG. 13, the surface of the first cavity 211 against which the second surface of the sheet is pressed when thermo/vacuum forming the sheet in step 105 may be interrupted at one or more pre-determined locations. In particular, the surface of the first cavity 211 may be interrupted at one or more predetermined locations by at least one through hole or duct in the first cavity. Such through hole(s) or duct(s) may be provided, for example, by the through hole(s) or duct(s) 33 extending through the first element, as indicated in FIG. 13.

The through hole(s) or duct(s) interrupting the surface of the first cavity 211 may be connected to at least one vent channel 213 that preferably extends through the female mold member and connects to the surrounding atmosphere and/or to a source of reduced pressure (e.g., to a vacuum source). Such vent channel may allow to increase a relative pressure acting on the sheet at the pre-determined locations when compared to other regions of the sheet.

The thermo/vacuum forming tool 200 may further comprise at least one valve (not shown) that closes and/or opens the vent channel to increase the pressure difference at a predetermined stage of the forming process. The valve may be actuated one or more times to provide one or more bursts of compressed air through the sheet.

In case the sheet has previously been provided with a hole or slit in step 102, step 107 may serve to enlarge said hole or slit.

As indicated at 108, the method may, optionally, include a step of closing the vent before removing the container from the tool in step 109. In particular, the valve assembly according to the present invention may be closed in the tool by rotating the second element 40 with respect to the first element 30 into the closed position shown in FIG. 11.

The tool 200 may be provided with a mechanism for rotating the second element 40 and/or with a rotation restriction mechanism for avoiding rotation of the first element with respect to the container 20. Avoiding rotation of the first element 30 may be helpful for reducing cycle times since the valve assembly may be closed in this case while the container 20 (i.e., the sheet) is still in a softened condition. The rotation restriction mechanism of the tool 200 may include at least one pin (not shown in the drawings) extending into the at least one rotation restriction feature 39 of the first element 30.

As indicated by step 110 in FIG. 12, the container may, in some instances, also be provided with the vent after removing the container from the thermo/vacuum forming tool in step 109. This may be achieved, for example, by punching, drilling and/or laser cutting the formed container (e.g., a container base and/or a container sidewall thereof). Alternatively or additionally, a punching and/or cutting mechanism could be provided directly in the thermo/vacuum forming tool.

While FIG. 13 shows the first element 30 of the valve assembly being placed in the region of the first cavity 211 that forms the container base 21 in the thermo/vacuum forming step 105, it should be noted that the invention is not limited in this manner and the first element 30 may also be placed in a region of the first cavity 211 that forms the container sidewall 22. Accordingly, also the second cavity 212 may be formed in this region of the first cavity 211 that forms the container sidewall 22.

FIG. 14 shows a first element 30 of a valve assembly according to the present invention with an optional rib 432 being provided on the first side 30-1 of the first element. The rib 432 may have an annular shape and may extend around one or more ducts 33 extending through the first element. The rib 432 may extend into the first cavity 211 when the first element 30 is placed in the tool 200 (see FIG. 13) and may facilitate the formation of an intimate and stable bond between the first element and the thermo/vacuum formed sheet.

While FIGS. 13 and 14 illustrate a single duct 33 extending through a central portion of the first element 30, it will be appreciated that such single duct 33 may also be offset from the center of the first element. The first elements shown in these figures may also be provided with several ducts, for example in the manner described above with respect to FIGS. 7 to 11.

FIG. 15 illustrates a first element 30 of a valve assembly according to the present invention wherein the first element 30 is provided with an optional flash 432. As apparent from FIG. 15, the flash 432 may extend at least partially or completely around the flange 32.

FIGS. 16 through 19 illustrate further variations of containers according to the present invention.

More specifically, FIG. 16 shows a container 520 with a valve assembly provided in the container sidewall 22. The valve assembly may comprise, for example, a first element 530 that is bonded to and/or embedded into the container sidewall (e.g., via the thermo/vacuum forming process described above). A second element 540 may be provided to close the valve assembly, in particular to close a duct extending through the first element 530. The second element 540 may, for example, be configured to be screwed onto and/or into the first element 530. For example, the second element 540 may form a cap with an internal or external threading that engages with an external or internal threading, respectively, of the first element 530. Alternatively or additionally, the second element may be configured as a plug that is pushed onto and/or inserted into the first element 530. The slot, in particular the first slot portion 17 and/or the second slot portion 18, provided in the outer cup 10 (see FIG. 1) may be configured to receive the first element 530 and/or the second element 540. This may allow the valve assembly to move along and/or through the slot 17, 18 as the container 520 collapses when the valve assembly is closed.

FIG. 17 shows a container 620 with a valve assembly that comprises a first element which is at least partially formed by a tubular member 630 having a lumen that extends therethrough. As illustrated, the lumen of the tubular member 630 may be connected to a vent of the container 620 that is provided in the container base 21. For example, a first end portion of the tubular member 630 may be connected to the vent in the container base 21. A second end of the tubular member 630 may be configured to be opened and closed by a user, for example by clamping the tubular member together and/or by closing it with a removable plug or cap. The tubular member 630 may extend towards and/or radially outward past the container sidewall 22. When the container 620 is inserted into the outer cup 10, the tubular member may extend through the slot 17, 18 (see FIG. 1). The tubular member 630 may be bonded to and/or partially embedded into the container base 21 and/or into the container sidewall 22, for example via the thermo/vacuum forming process described above.

According to a further variation illustrated in FIGS. 18 and 19, a container 720 may be provided with valve assembly comprising a plug-like second element 740 that is inserted into a first element 730, in particular into a first element 730 that is bonded to and/or partially embedded into the container base 21. As apparent from FIG. 19, the first element 730 may form a seal around a vent 26 formed in the container base 21. In addition to the first element 730, also the second element 740 may be bonded to and/or embedded into the container. In particular, the second element 740 may be bonded to and/or embedded into the container base 21 such that it overlaps the vent 26. In this case, the second element 740 may form an additional seal around the vent 26, which may subsequently be ruptured by the user when opening the valve assembly for the first time. The valve assembly may subsequently be re-sealed by plugging the second element 740 into the first element 730. The first element 730 and the second element 740 may optionally be connected via a living hinge 735 and may be integrally formed.

While the bonding of the first element 730 and the second element 740 has been described with reference to FIGS. 18 and 19 for a plug-like second element 740, it is to be understood that such bonding of the first and second elements to the container may also be provided in other instances, for example when the first and second elements are threadingly connected (see, e.g., the discussion of FIG. 16 above).

As apparent from FIGS. 16 through 18, the containers 520, 620 and 720 may be stood upside down on a top edge or a rim 24 without deforming and/or collapsing under the influence of gravity.

FIG. 22 shows container 820 having a base 821 and sidewalls 822. The container 820 has two fluid ports, 830 and 831. As can be seen, fluid port 830 is part of a separate part 825, bonded to the container base 821. FIG. 23 is a cross section of FIG. 22, and shows separate part 825 is bonded to the internal surface of the base 840.

FIG. 24 shows container 920 having a base 921 and sidewalls 922. The container 920 has two fluid ports, 930 and 931. As can be seen, fluid port 930 is part of a separate part 925, bonded to the exterior surface 941 of container base 921. FIG. 25 is a cross section of FIG. 24, and shows separate part 925 is bonded to the external surface of the base 941.

FIGS. 26*a*-26*d* show embodiments of the separate part fluid port 950*a-d*. In these embodiments, the fluid port 951*a-d* is shown. The separate part fluid port 950*a-d* comprises a first side 952*a-d* and a second side 953*a-d*. In some embodiments, the first side is bonded to the container body, and in some embodiments the second side is bonded to the container body. Configurations of the fluid port, especially the external shapes of the fluid port, are seen in embodiments where the separate piece fluid port is connected to a spray gun assembly, and a fluid tight connection is necessary.

FIG. 27 shows a container 1020 having a base 1021 and sidewalls 1022. The container 1020 has two fluid ports, 1030 and 1031. Fluid port 1030 is a separate part fluid port and fluid port 1031 is the open mouth of the container 1020. A sealing mechanism 1040 is incorporated into the container at the fluid port 1031.

While the above disclosure refers to a fluid delivery assembly for a paint spray gun, it is to be noted that the invention is not limited to this particular product. For example, containers according to the invention and/or manufactured with the methods and/or tools disclosed herein could be used for different purposes and/or in different systems. For example, the above disclosure focuses on a gravity fed spray gun, but the containers and methods described herein may also be advantageous in suction fed spray guns. Moreover, the present disclosure focuses on a spray gun for paint, but the containers and methods described herein may also be advantageous in other types of spraying devices (e.g., in devices for spraying herbicides and/or pesticides or in devices for spraying foams). Even further, it is also envisaged that containers provided in accordance with the above disclosure could be used for purposes unrelated to spray guns, either as such or as liners for other receptacles. One example would be pot for cultivating plants (e.g., flowers), wherein containers according to the present invention could be used as a novel pot or as a novel liner in known pots, wherein the vent provided in the container could allow for drainage of water on-demand from the pot/liner (in particular when using the closures or valve assemblies described above).

It is further to be noted in this context that the first element described above does not necessarily have to be part of a valve assembly, but could also fulfill other purposes. The first element may thus also be referred to as a first component in the context of the present disclosure, in particular a pre-formed element or component. Such first element or component may be attached with the techniques disclosed herein to thermo/vacuum formed articles of numerous types and purposes, in particular by inserting the first element or component into a tool cavity before thermo/vacuum forming the article and/or attaching the first element or component to the article during the thermo/vacuum forming process and/or before removing the respective thermo/vacuum formed article from the thermo/vacuum forming tool. A "pre-formed element or component" in this context may be, in particular, an element or component that is provided with its shape (e.g. a three-dimensional shape) before it is inserted into the thermo/vacuum forming tool used to shape the article itself Such first element or component may be, inter alia, a support or stiffening component.

Such support or stiffening component in certain circumstances may also be useful in the general type of containers for spray guns that is described above, for example if it is desired to stiffen and/or provide additional rigidity to certain parts of the container. Supports and/or stiffening components may be combined with or provided independently from the remaining container features described above (e.g., they may be combined or provided independently of the above described vent).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above. As far as the expressions "generally" or "substantially" are used, the present application is to be understood as disclosing these features and values also as entirely met, i.e. without the preceding characterization as "generally" or "substantially".

The present application is directed to the following embodiments:

In one embodiment, the application is directed to a container for holding paint comprising at least two fluid ports, wherein the container has a body that is shape self supporting and is a non-rigid construction and at least one fluid port is a separate part from the body of the container.

In another embodiment, the application is directed to a container according to any other embodiment, wherein the separate part fluid port is sealed to the container.

In another embodiment, the application is directed to a container according to any other embodiment, wherein the separate part fluid port is sealed to the container with a mechanical seal.

In another embodiment, the application is directed to a container according to any other embodiment, wherein the separate part fluid port is sealed to the container with a thermal seal.

In another embodiment, the application is directed to a container according to any other embodiment, wherein the separate part fluid port is sealed to the container with a fluid tight seal.

In another embodiment, the application is directed to a container according to any other embodiment, wherein least part of the separate part fluid port is on an exterior surface of the container.

In another embodiment, the application is directed to a container according to any other embodiment, wherein the container is a thermoformed piece.

In another embodiment, the application is directed to a container according to any other embodiment, wherein the separate part fluid port is an injection molded piece.

In another embodiment, the application is directed to a container according to any other embodiment, wherein the separate part fluid port is a different material than the container.

In another embodiment, the application is directed to a container according to any other embodiment, wherein the separate part fluid port is the same material than the container.

In another embodiment, the application is directed to a container according to any other embodiment, wherein the container has a base and one or more sidewalls extending from the base.

In another embodiment, the application is directed to a container according to any other embodiment, wherein the sidewalls have a thickness of 0.4 mm or less.

In another embodiment, the application is directed to a container according to any other embodiment, wherein the sidewalls have a variable thickness.

In another embodiment, the application is directed to a container according to any other embodiment, wherein the sidewall thickness is smaller near the base.

In another embodiment, the application is directed to a container according to any other embodiment, wherein the container has a cylindrical shape extending from a circular base.

In another embodiment, the application is directed to a container according to any other embodiment, wherein the separate fluid port extends through the base.

In another embodiment, the application is directed to a container according to any other embodiment, wherein the container is a blow molded piece.

In another embodiment, the application is directed to a container according to any other embodiment, wherein the separate part fluid port is a vent for air movement.

In another embodiment, the application is directed to a container according to any other embodiment, wherein the separate part fluid port extends through a container sidewall.

In another embodiment, the application is directed to a container according to any other embodiment, wherein the container base and the container sidewalls are integrally formed with each other.

In another embodiment, the application is directed to a container according to any other embodiment, wherein the container is made from a polymeric material.

In another embodiment, the application is directed to a container according to any other embodiment, wherein the container base and the container sidewalls are formed from a single sheet of polymeric material.

In another embodiment, the application is directed to a container according to any other embodiment, wherein the vent is provided by a single vent hole or by a plurality of vent holes.

In another embodiment, the application is directed to a container according to any other embodiment, wherein the container comprises a closure or a valve assembly that is configured to open and close the vent.

In another embodiment, the application is directed to a container according to any other embodiment, wherein the valve assembly includes at least one first element, wherein the first element has a first side that is bonded to at least one of the container base and a container sidewall.

In another embodiment, the application is directed to a container according to any other embodiment, wherein the first element is at least partially embedded into the at least one of the container base and the container sidewall.

In another embodiment, the application is directed to a container according to any other embodiment, wherein the first element is bonded to the container by at least one of thermo/vacuum forming, gluing, welding or any combination thereof.

In another embodiment, the application is directed to a container according to any other embodiment, wherein first element forms a seal with the container around the at least one vent.

In another embodiment, the application is directed to a container according to any other embodiment, wherein the container is thermo/vacuum formed and the first element is an injection molded part.

In another embodiment, the application is directed to a container according to any other embodiment, wherein the first element comprises at least one flange.

In another embodiment, the application is directed to a container according to any other embodiment, wherein the first element comprises an attachment portion to which a second element of the valve assembly is movably attached.

In another embodiment, the application is directed to a container according to any other embodiment, wherein the flange extends around the attachment portion.

In another embodiment, the application is directed to a container according to any other embodiment, wherein the first element has a second side that is opposed to the first side, wherein the attachment portion comprises an attachment protrusion that protrudes from the second side.

In another embodiment, the application is directed to a container according to any other embodiment, wherein the attachment protrusion is ring-shaped.

In another embodiment, the application is directed to a container according to any other embodiment, wherein the first element comprises an annular rib extending on the first side.

In another embodiment, the application is directed to a container according to any other embodiment, wherein the first element comprises a flash extending at least partially around the flange.

In another embodiment, the application is directed to a container according to any other embodiment, wherein the second element is an injection molded part.

In another embodiment, the application is directed to a container according to any other embodiment, wherein the first element comprises at least one duct with a first end that is open to the first side and a second end that is open to the second side.

In another embodiment, the application is directed to a container according to any other embodiment, wherein the first element comprises a plurality of ducts.

In another embodiment, the application is directed to a container according to any other embodiment, wherein the second element is configured to be moved from an open position in which the valve assembly is open to a closed position in which the valve assembly is closed.

In another embodiment, the application is directed to a container according to any other embodiment, wherein the second element is rotatable with respect to the first element.

In another embodiment, the application is directed to a container according to any other embodiment, wherein the second element is rotatable with respect to the first element for less than 360°.

In another embodiment, the application is directed to a container according to any other embodiment, wherein the valve assembly comprises at least one of a first stop for limiting rotation of the second element in the closed position and a second stop for limiting rotation of the second element in the open position.

In another embodiment, the application is directed to a container according to any other embodiment, wherein the second element comprises one or more sealing surfaces, wherein the sealing surface overlaps the second end of the duct when the second element is moved into the closed position.

In another embodiment, the application is directed to a container according to any other embodiment, wherein the second element comprises one or more openings or recesses, wherein the opening or recess overlaps the second end of the duct when the second element is moved into the open position.

In another embodiment, the application is directed to a container according to any other embodiment, wherein the second element moves towards the first element or away from the first element when moving from the open position to the closed position.

In another embodiment, the application is directed to a container according to any other embodiment, wherein the first element comprises at least one ramp.

In another embodiment, the application is directed to a container according to any other embodiment, wherein the second element slides along the ramp when moving from the open position to the closed position.

In another embodiment, the application is directed to a container according to any other embodiment, wherein at least one of the first element and the container are provided with at least one first indication feature and the second element is provided with at least one second indication feature; and wherein the valve assembly is in the open position or in the closed position when the positions of the first and second indication features match with each other.

In another embodiment, the application is directed to a container according to any other embodiment, wherein the first element comprises a rotation restriction feature configured to limit rotation of the first element in a thermo-vacuum forming tool.

In another embodiment, the application is directed to a container according to any other embodiment, wherein the second element is a plug that is inserted into the first element.

In another embodiment, the application is directed to a container according to any other embodiment, wherein both the first element and the second element are bonded to the container.

In another embodiment, the application is directed to a container according to any other embodiment, wherein the first element is a tubular member.

In another embodiment, the application is directed to a container according to any other embodiment, and the assembly further comprises an outer cup, wherein the container is received within the outer cup, and wherein the outer cup is more rigid than the container.

In another embodiment, the application is directed to a container according to any other embodiment, wherein the outer cup comprises at least one an outer cup base, one or more outer cup sidewalls, and an outer cup top end.

In another embodiment, the application is directed to a container according to any other embodiment, wherein the outer cup comprises a cutout in at least one of the outer cup base and the outer cup sidewalls, wherein at least part of the valve assembly protrudes through the cutout.

In another embodiment, the application is directed to a container according to any other embodiment, wherein the assembly further comprises a removable lid, wherein the removable lid comprises an outlet that is configured to be connected to an inlet of the spray gun.

In another embodiment, the application is directed to a container according to any other embodiment, wherein the lid is attached to at least one of the outer cup and the container via at least one of a snap-fit connection or a threaded connection.

In another embodiment, the application is directed to a container according to any other embodiment, wherein the assembly further comprises a screw-on collar.

In another embodiment, the application is directed to a container according to any other embodiment, wherein the screw-on collar is snap fitted to the lid.

In another embodiment, the application is directed to a a fluid delivery assembly according to any of the embodiments.

In another embodiment, the application is directed to a container according to any other embodiment, wherein at least one fluid port is integral to the container.

In another embodiment, the application is directed to a container according to any other embodiment, wherein the integral fluid port is an open mouth of the container.

In another embodiment, the application is directed to a container according to any other embodiment, wherein a first fluid port is on a first end of the container and a second fluid port is on a second end of the container opposite the first end, and the second end incorporates a sealing mechanism integrated into the container.

In another embodiment, the application is directed to a container according to any other embodiment, wherein the first fluid port is a separate part from the container.

What is claimed is:

1. A container for holding paint comprising at least two fluid ports, wherein the container has a body that is shape self supporting which maintains its shape under influence of gravity and is a non-rigid construction that is deformable or collapsible as fluid is withdrawn from a spray gun and at least one fluid port is a separate part from the body of the container;

wherein the body has a container base and one or more container sidewalls extending from the container base; wherein at least one fluid port is an open mouth of the container, wherein the container comprises an open container top end that is delimited by the one or more container sidewalls and a rim;

wherein the container base comprises a vent formed therein, wherein the separate part fluid port comprises a valve assembly that is configured to open and close the vent, wherein the valve assembly includes a first element forming a seal around the vent, wherein the first element has a first side that is bonded to an exterior surface of the container base and the first element forms a seal around the vent;

wherein the first element has a second side opposite the first side, the second side comprises a tubular opening leading to the vent, wherein the second side is exposed to the surrounding atmosphere outside the container.

2. The container of claim 1, wherein the separate part fluid port is sealed to the container with a thermal seal.

3. The container of claim 1, wherein the separate part fluid port is sealed to the container with a fluid tight seal.

4. The container of claim 1, wherein the separate part fluid port is a different material than the container.

5. The container of claim 1, wherein the separate part fluid port is the same material than the container.

6. The container of claim 1, wherein the sidewalls have a thickness of 0.4 mm or less.

7. The container of claim 1, wherein the sidewalls have a variable thickness.

8. The container of claim 7, wherein the sidewall thickness is less near the base.

9. The container of claim 1, wherein the separate fluid port extends through the base.

10. The container of claim 1, wherein the container is a blow molded piece.

11. The container of claim 1, wherein the container is thermo/vacuum formed and the first element is an injection molded part.

12. The container of claim 1, wherein the first element has a hole formed therein, the hole is aligned with the vent.

13. The container of claim 12, wherein the valve assembly comprises a second element that is configured to reseal the hole in the first element by plugging the second element into the first element.

14. The container of claim 1, wherein the first element and second element are connected together.

15. A fluid delivery assembly comprising:

the container of claim 1, and an outer cup in which the container is placed, comprising an outer cup base, wherein the outer cup base comprises a cutout formed therein, the cutout is configured to allow the separate part valve assembly to be assessed or protrude at least partially through the container base.

16. The fluid delivery assembly of claim 15, wherein the cutout is configured to at least partially overlap or at least partially encircle the valve assembly when the container is inserted into the outer cup.

17. The fluid delivery assembly of claim 1, wherein the first element has a first side that is bonded directly onto an exterior surface of the container base.

18. The fluid delivery assembly of claim 1, wherein the first side is bonded to an exterior surface of the container base by thermo/vacuum forming, gluing, welding or any combination thereof.

* * * * *